(12) United States Patent
Uchida et al.

(10) Patent No.: US 8,785,039 B2
(45) Date of Patent: Jul. 22, 2014

(54) BATTERY-DEDICATED ELECTRODE FOIL, POSITIVE ELECTRODE PLATE, BATTERY, VEHICLE, AND BATTERY-EQUIPPED APPLIANCE, AND MANUFACTURE METHOD FOR THE BATTERY-DEDICATED ELECTRODE FOIL, AND MANUFACTURE METHOD OF THE POSITIVE ELECTRODE PLATE

(75) Inventors: Yozo Uchida, Toyota (JP); Tadashi Teranishi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 580 days.

(21) Appl. No.: 13/002,665

(22) PCT Filed: Jul. 1, 2009

(86) PCT No.: PCT/IB2009/006143
§ 371 (c)(1),
(2), (4) Date: Jan. 5, 2011

(87) PCT Pub. No.: WO2010/004398
PCT Pub. Date: Jan. 14, 2010

(65) Prior Publication Data
US 2011/0111290 A1 May 12, 2011

(30) Foreign Application Priority Data
Jul. 11, 2008 (JP) ................................. 2008-181837

(51) Int. Cl.
*H01M 10/26* (2006.01)
*H01M 4/66* (2006.01)
*H01M 4/58* (2010.01)
*H01M 4/139* (2010.01)
*B05D 5/12* (2006.01)
*H01B 13/00* (2006.01)

(52) U.S. Cl.
USPC ................... 429/207; 429/231.95; 429/218.1; 29/623.5; 427/77; 216/13

(58) Field of Classification Search
None
See application file for complete search history.

(56) References Cited

U.S. PATENT DOCUMENTS

2006/0076243 A1    4/2006   Aoyama et al.
2006/0134501 A1*   6/2006   Lee et al. .................. 429/38
2008/0131779 A1*   6/2008   Kami et al. ................ 429/221

FOREIGN PATENT DOCUMENTS

CN    1827845     9/2006
JP    6-302477    10/1994
JP    7-297089    11/1995

(Continued)

OTHER PUBLICATIONS

English translation of Notification of the First Office Action for Chinese Appl. No. 200980126794.3 dated Nov. 14, 2012.

(Continued)

*Primary Examiner* — Barbara Gilliam
*Assistant Examiner* — Angela Martin
(74) *Attorney, Agent, or Firm* — Finnegan, Henderson, Farabow, Garrett & Dunner, LLP

(57) ABSTRACT

A battery-dedicated electrode foil (32) includes an aluminum electrode foil (33) in which metal aluminum is exposed, and corrosion-resistant layers (34A, 34B) that are formed on surfaces (33a, 33b) of the aluminum electrode foil, and that are in direct contact with the metal aluminum that forms the aluminum electrode foil, and that is made of tungsten carbide.

12 Claims, 18 Drawing Sheets

(56) References Cited

FOREIGN PATENT DOCUMENTS

| | | |
|---|---|---|
| JP | 10-106585 | 4/1998 |
| JP | 11-250900 | 9/1999 |
| JP | 2002-373644 | 12/2002 |
| JP | 2003-224036 | 8/2003 |
| JP | 2007-109454 | 4/2007 |
| JP | 2007-305453 | 11/2007 |
| JP | 2008-153118 | 7/2008 |
| JP | 2008-160053 | 7/2008 |
| WO | WO 2005/003404 A | 1/2005 |

OTHER PUBLICATIONS

International Search Report in International Application No. PCT/IB2009/006143; Mailing Date: Oct. 9, 2009.

Notification of Reason(s) for Refusal in Japanese Application No. 2008-181837; Drafting Date: Nov. 17, 2010.

Written Opinion of the International Searching Authority in International Application No. PCT/IB2009/006143; Mailing Date: Oct. 9, 2009.

Response to Written Opinion of the International Searching Authority in International Application No. PCT/IB2009/006143; Dec. 7, 2009.

* cited by examiner

BATTERY-DEDICATED ELECTRODE FOIL, POSITIVE ELECTRODE PLATE, BATTERY, VEHICLE, AND BATTERY-EQUIPPED APPLIANCE, AND MANUFACTURE METHOD FOR THE BATTERY-DEDICATED ELECTRODE FOIL, AND MANUFACTURE METHOD OF THE POSITIVE ELECTRODE PLATE

CROSS-REFERENCE TO RELATED APPLICATIONS

This application is a national phase application of International Application No. PCT/IB2009/006143, filed Jul. 1, 2009, and claims the priority of Japanese Application No. 2008-181837, filed Jul. 11, 2008, the contents of both of which are incorporated herein by reference.

BACKGROUND OF THE INVENTION

1. Field of the Invention

The invention relates to a battery-dedicated electrode foil for use in a positive electrode plate of a battery, a positive electrode plate, a battery, and a vehicle and a battery-equipped appliance that employ the battery as well as a manufacture method for the battery-dedicated electrode foil, and a manufacture method for the positive electrode plate.

2. Description of the Related Art

In recent years, along with the wide-spread use of portable electronic appliances, such as cellular phones, notebook type personal computers, video camcorders, etc., and vehicles, such as hybrid electric motor vehicles and the like, the demand for batteries for use as power sources for driving these devices is increasing. Among these batteries, there exist batteries that employ a positive electrode foil whose base material is an aluminum electrode foil. Examples of such batteries include a lithium-ion battery that employs a positive electrode plate formed by applying a Li compound-containing positive electrode active material to such an aluminum electrode foil.

However, on a surface of an aluminum electrode foil, an aluminum oxide layer as a non-conductor is usually formed as a natural process to a thickness of, for example, about 5 nm. Therefore, if a positive electrode active material is formed on such an aluminum electrode foil, the electroconductivity between the aluminum electrode foil and the positive electrode active material tends to be low. Besides, the aluminum oxide layer is not sufficiently corrosion-resistant, and there is a risk of corrosion being caused by a positive electrode active material paste applied thereto, or by an electrolyte solution in the battery. In conjunction with these drawbacks, Japanese Patent Application Publication No. 10-106585 (JP-A-10-106585) discloses that a carbon film is formed on a surface of an aluminum electrode foil (aluminum current collector) so as to improve corrosion resistance and electroconductivity. Besides, Japanese Patent Application Publication No. 11-250900 (JP-A-11-250900) discloses that an electroconductive coating layer made of carbon, platinum or gold is formed on a current collector after the surface of the current collector has been etched.

However, in the case where a carbon film is formed as in JP-A-10-106585 and JP-A-11-250900, an attempt to form the film by the sputtering process, which has high mass productivity, often results in formation of an insulating diamond-like carbon (DLC) film, and thus involves a risk of reducing the electroconductivity. The use of platinum or gold, on the other hand, is costly, and may not be practical.

SUMMARY OF THE INVENTION

The invention provides a battery-dedicated electrode foil for use in a positive electrode plate of a battery which is inexpensive but has good corrosion resistance and electroconductivity. The invention also provides a positive electrode plate that employs this battery-dedicated electrode foil, and a battery that employs the positive electrode plate, and further provides a vehicle and a battery-equipped appliance that employ the battery. Besides, the invention also provides a manufacture method for the battery-dedicated electrode foil, and a manufacture method for the positive electrode plate.

A first aspect of the invention is a battery-dedicated electrode foil that includes an aluminum electrode foil in which metal aluminum is exposed, or which has on metal aluminum an aluminum oxide layer of 3 nm or less in film thickness, and a corrosion-resistant layer that is formed on a surface of the aluminum electrode foil, and that is in direct contact with the metal aluminum of the aluminum electrode foil, or in contact with the aluminum oxide layer, and that is made of a carbide or an oxide of at least one substance selected from the group consisting of tungsten, tantalum, hafnium, niobium, molybdenum, and vanadium.

The present inventors have found that in the case where a portion of the aluminum oxide layer formed on the aluminum electrode foil is removed to reduce a layer thickness of the aluminum oxide layer to 3 nm or less, the value of the resistance that occurs in the thickness direction of the aluminum electrode foil sharply becomes smaller. Therefore, the use of an aluminum electrode foil from which the aluminum oxide layer has completely been removed, or an aluminum electrode foil having an aluminum oxide layer whose layer thickness is 3 nm or less, the value of the resistance occurring between the aluminum electrode foil and the positive electrode active material layer formed on the aluminum electrode layer can certainly be made small.

Therefore, in the battery-dedicated electrode foil of the invention, a corrosion-resistant layer is formed on a surface of the aluminum electrode foil, being in direct contact with the metal aluminum that constitutes the aluminum electrode foil, or in contact with the aluminum oxide layer whose film thickness is 3 nm or less. Therefore, the battery-dedicated electrode foil of the invention can maintain better electroconductivity brtween the aluminum electrode foil and the corrosion-resistant layer than a battery-dedicated electrode foil in which a corrosion-resistant layer is formed on an aluminum foil that has an aluminum oxide layer whose film thickness is greater than 5 nm and which is, for example, naturally formed.

Examples of a material of the corrosion-resistant layer of the battery-dedicated electrode foil include tungsten carbides, such as WC, $W_3C$, etc., tungsten oxides, such as $WO_3$, $W_2O_3$, etc., tantalum carbides, such as TaC, and the like, tantalum oxides, such as $TaO_2$, and the like, hafnium carbides, such as HfC, and the like, hafnium oxides such as $HfO_2$ and the like. Besides, examples of a material of the corrosion-resistant layer further include niobium carbides, such as $Nb_2C$, NbC, etc., niobium oxides, such as NbO, $Nb_2O_5$, etc., vanadium carbides, such as VC, and the like, vanadium oxides, such as VO, $V_2O_3$, $VO_2$, etc.

Besides, examples of the electroconductivity of the corrosion-resistant layer are 17 $\mu\Omega\cdot cm$ for tungsten carbide (WC), 0.31 $\mu\Omega\cdot cm$ for tantalum carbide (TaC), 0.26 $\mu\Omega\cdot cm$ for hafnium carbide (HfC), 0.10 $\mu\Omega\cdot cm$ for niobium carbide (NbC), 0.09 $\mu\Omega\cdot cm$ for molybdenum carbide ($MO_2C$), and 0.05 μΩ·cm for vanadium carbide (VC). Furthermore, examples of the electroconductivity of the corrosion-resistant layer are 88 μΩ·cm for tungsten oxide ($WO_3$), 0.92 μΩ·cm for tantalum oxide ($Ta_2O_5$), 1.01 μΩ·cm for hafnium oxide ($HfO_2$), 0.83 μΩ·cm for niobium oxide (NbO), 0.78 μΩ·cm for molybdenum oxide ($MoO_3$), and 1.11 μΩ·cm for vanadium oxide (VO).

The corrosion-resistant layer of any of the foregoing materials has an electroconductivity that is not so good as (Ag, 2.35 μΩ·cm) and copper (Cu, 1.67 μΩ·cm) but is better than or about as good as that is titanium (Ti, 42 μΩ·cm). Hence, since the battery-dedicated electrode foil of the invention includes the foregoing aluminum electrode foil and the foregoing corrosion-resistant layer, low resistance between the battery-dedicated electrode foil and the positive electrode active material can be achieved.

Furthermore, the material used for the corrosion-resistant layer is a carbide or an oxide of at least one substance selected from the group consisting of tungsten, tantalum, hafnium, niobium, molybdenum, and vanadium. Each of these substances has high corrosion resistance to Li ion and the like. Therefore, it is possible to provide a battery-dedicated electrode foil with good corrosion resistance which is not easily corroded, for example, even in the case where the electrode foil is in contact with an electrolyte solution containing Li and has positive potential, or where a positive electrode active material layer is formed on the electrode foil by applying thereto a strongly alkaline aqueous paste containing a positive electrode active material made of a Li compound.

Besides, since the carbide or oxide forming the corrosion-resistant layer has hydrophilicity, a water-based paste (a paste containing a positive electrode active material, or the like) can be applied onto the corrosion-resistant layer without being repelled by the corrosion-resistant layer, that is, can wet the application surface of the battery-dedicated electrode foil (corrosion-resistant layer). Besides, good adhesion between the active material layer and the battery-dedicated electrode foil can also be achieved.

Examples of the technique of forming the corrosion-resistant layer include gas phase growth methods such as sputtering and the like.

Furthermore, the corrosion-resistant layer may be in direct contact with the metal aluminum that forms the aluminum electrode foil.

In the foregoing case, better electroconductivity between the battery-dedicated electrode foil and a positive electrode active material layer formed on a main surface of the electrode foil can be maintained than in the case where a surface of an aluminum electrode foil has thereon an electrically insulating aluminum oxide layer. Therefore, low resistance between the battery-dedicated electrode foil and the positive electrode active material layer can be achieved.

Alternatively, the corrosion-resistant layer may be in contact with an aluminum oxide layer whose film thickness is 3 nm or less. In this case, the value of the resistance of the aluminum electrode foil in the thickness direction can be made considerably lower than in the case where an aluminum foil having an aluminum oxide layer whose film thickness is larger than 3 nm, for example, is a naturally occurring thickness (about 5 nm). Therefore, good electroconductivity between the corrosion-resistant layer and the aluminum electrode foil can be maintained.

Furthermore, the corrosion-resistant layer may also be formed from a carbide of at least one substance selected from the group consisting of tungsten, tantalum, hafnium, niobium, molybdenum, and vanadium.

Since the corrosion-resistant layer is constructed of a carbide of the foregoing substance that has electroconductivity, low resistance between the battery-dedicated electrode foil and the positive electrode active material can be achieved.

Alternatively, the corrosion-resistant layer may also be formed from a carbide or an oxide of tungsten.

Since tungsten carbide or tungsten oxide has electroconductivity, low resistance between the battery-dedicated electrode foil and the positive electrode active material can be achieved.

Besides, a thickness of the corrosion-resistant layer may be 3 to 90 nm.

From measurements of the value of the resistance occurring between aluminum electrode foils each of which has a corrosion-resistant layer made of tungsten carbide or tungsten oxide which is directly formed on a surface of an aluminum electrode foil, it is now understood that the resistance value is high if the thickness of the corrosion-resistance layer is thin, and that the resistance value decreases with increases in the thickness of the corrosion-resistant layer. From the degree of the decrease, it is now understood that if the thickness of the corrosion-resistant layer is 3 nm or greater, the resistance that occurs between the electrode foil (metal aluminum) and the corrosion-resistant layers can be made sufficiently low. On the other hand, in the case where the thickness of the corrosion-resistant layer is greater than 100 nm, the aluminum electrode foil wrinkles due to the stress that occurs when the corrosion-resistant layer is formed, and therefore it becomes difficult to form a flat battery-dedicated electrode foil. Therefore, it is preferable that the thickness of the corrosion-resistant layer be within the foregoing range.

Furthermore, it is preferable that the thickness of the corrosion-resistant layer be within the range of 3 to 20 nm. Since time and cost is required in order to thicken the corrosion-resistant layer, it is desirable that the corrosion-resistant layer be as thin as possible. Therefore, it is preferable that the thickness of the corrosion-resistant layer be within the foregoing range.

Besides, a diamond-like carbon coating of 0.5 to 50 nm in thickness may be formed on the corrosion-resistant layer.

The formation of the diamond-like carbon (DLC) coating on the corrosion-resistant layer makes the corrosion resistance even better. Besides, since the DLC coating is formed to a thickness within the range of 0.5 to 50 nm, it is possible to provide an inexpensive battery-dedicated electrode foil that is easy to form and is free of the influence of the stress (e.g., formation of wrinkles) caused by the formation of the DLC coating. Furthermore, if an attempt to form the DLC coating directly on the metal aluminum is made, the adhesion therebetween becomes low and therefore the formation of the DLC coating is difficult. However, by interposing the corrosion-resistant layer made of tungsten carbide or the like, the DLC coating that is strongly adhered to the metal aluminum can be formed. Thus, a battery-dedicated electrode foil whose corrosion resistance can be certainly maintained can be provided.

Incidentally, the diamond-like carbon (DLC) coating refers to a hard coating made of carbon or hydrocarbon and having SP2 or SP3 bonds.

A second aspect of the invention is a positive electrode plate that includes the above-described battery-dedicated electrode foil, and a positive electrode active material layer containing a positive electrode active material which is supported on a main surface of the aforementioned battery-dedicated electrode foil.

In the positive electrode plate of the invention, since the battery-dedicated electrode foil is provided with the foregoing corrosion-resistant layer or with the corrosion-resistant layer and the DLC coating, the corrosion resistance is high. Furthermore, the electroconductivity between the battery-dedicated electrode foil and the positive electrode active material layer can also be made good. Furthermore, since the corrosion-resistant layer is in contact with the aluminum electrode foil at low resistance, the positive electrode active material in the positive electrode active material layer supported on the main surface of the battery-dedicated electrode foil can receive electrons from or pass electrons to the aluminum electrode foil at low resistance. That is, a low-resistance positive electrode plate can be provided, and therefore a battery with low internal resistance can be realized.

Another advantage is that, at the stage where the positive electrode active material layer is supported, the application of a paste that forms the positive electrode active material layer will not corrode the main surface of the battery-dedicated electrode foil. Therefore, the positive electrode plate of the invention makes a positive electrode plate that stably supports thereon the positive electrode active material layers without the positive electrode active material layers falling apart from the battery-dedicated electrode foil. Besides, also at the stage where the positive electrode plate is used in a battery, the main surface of the battery-dedicated electrode foil does not corrode despite contact with the electrolyte solution. Therefore, within the battery, the positive electrode active material layer does not fall apart from the battery-dedicated electrode foil by corrosion, and a problem of decomposition of the electrolyte solution or the like does not occur. Thus, the positive electrode plate can be stably used.

Incidentally, as for the positive electrode active material, a positive electrode active material that is appropriate in a battery system to be realized may be employed. Examples of the positive electrode active material include lithium-containing layered oxides, such as $LiCoO_2$, $LiNiO_2$, $LiMn_2O_4$, $LiMnO_2$, $LiCo_{0.5}Ni_{0.5}O_2$, $LiNi_{0.7}Co_{0.2}Mn_{0.1}O_2$, etc., and olivine-based oxides, such as $LiFePO_4$, and the like.

Furthermore, the positive electrode active material may contain a Li compound, and the positive electrode active material layer may be formed by applying a water-based active material paste whose solvent is water.

In the case where the Li compound-containing positive electrode active material is a paste whose solvent is water, strong alkali results. Therefore, when the positive electrode active material layer is to be formed, a strongly alkaline paste is applied to the battery-dedicated electrode foil. However, in the invention, since the positive electrode plate employs the foregoing battery-dedicated electrode foil, it does not happen that the paste corrodes aluminum, generating hydrogen gas, and that therefore many bubbles are contained in the positive electrode active material layer. Therefore, a dense and closely-packed positive electrode active material layer can be formed.

A third aspect of the invention is a battery that includes an electric power generation element that includes the foregoing positive electrode plate.

The battery of the invention includes the foregoing positive electrode plate in the power generation element. Therefore, although the positive electrode plate contacts the electrolyte solution in the battery, the main surface of the battery-dedicated electrode foil is not corroded. Hence, within the battery thus provided, the positive electrode active material layer does not fall apart from the battery-dedicated electrode foil due to corrosion, and occurrence of a problem of decomposition of the electrolyte solution or the like is prevented. Furthermore, since the corrosion-resistant layer is in contact with the aluminum electrode foil at low resistance, the positive electrode active material in the positive electrode active material layer supported on the main surface of the battery-dedicated electrode foil can receive electrons from or pass electrons to the aluminum electrode foil at low resistance. That is, a low-resistance positive electrode plate can be obtained, and a battery having a low internal resistance and being capable of providing a large current can be realized.

The foregoing battery may further include an electrolyte solution that contains Li ions, and the positive electrode active material layer may contain the positive electrode active material that is made of a Li compound.

In the Li-ion battery, the electric potential of the positive electrode (relative to Li ion) sometimes rises to a vicinity of 4.0 V, which is a state where the battery-dedicated electrode foil of the positive electrode is apt to be oxidized. However, since the battery of the invention employs the battery-dedicated electrode foil as described above, the battery-dedicated electrode foil does not oxidize during the use of the battery although the battery is a lithium-ion battery. Thus, the battery can be stably used.

Incidentally, examples of the electrolyte solution include electrolyte solutions each obtained by dissolving a solute, for example, $LiClO_4$, $LiPF_6$, $LiCF_3SO_3$, $LiAsF_6$, $LiBF_4$, etc., in an organic solvent, such as ethylene carbonate, ethyl methyl carbonate, dimethyl carbonate, diethyl carbonate, etc., or in a mixed organic solvent obtained by mixing two or more of the foregoing organic solvents. Among these, for example, an electrolyte solution containing a chlorine-based solute, such as $LiClO_4$ or the like, in any one of the foregoing organic solvents (mixed organic solvents) is able to realize high output in the battery in which the electrolyte solution is adopted.

Besides, the electrolyte solution may contain $LiClO_4$.

The use of $LiClO_4$ in the electrolyte solution provides an advantage of making it possible to increase the output of the battery. However, the electrolyte solution containing $LiClO_4$ corrodes the aluminum electrode foil despite the aluminum oxide layer formed on the surface of the foil. In the battery of this invention, although the electrolyte solution contains $LiClO_4$, the battery employs the positive electrode plate equipped with the battery-dedicated electrode foil that is equipped with the corrosion-resistant layer described above. Therefore, the battery can be used without corrosion by the $LiClO_4$-containing electrolyte solution, and the use of $LiClO_4$ makes it possible to realize a high-output battery.

A fourth aspect of the invention is a vehicle equipped with the above-described battery.

Since the vehicle of the invention is equipped with the foregoing battery, the vehicle achieves good running characteristic, and stable performance.

Incidentally, it suffices that the vehicle be a vehicle that uses electric energy from a battery as the entire amount of the vehicle's motive power source or a portion thereof. Examples of the vehicle include electric motor vehicles, hybrid motor vehicles, plug-in hybrid motor vehicles, hybrid railway vehicles, forklifts, electric wheelchairs, electric power-assisted bicycles, and electric scooters.

A fifth aspect of the invention is a battery-equipped appliance equipped with the above-described battery.

Since the battery-equipped appliance of the invention is equipped with any one of the foregoing batteries, the battery-equipped appliance can achieve good usage characteristics and stable performance.

Incidentally, it suffices that the battery-equipped appliance be an appliance that is equipped with a battery and uses the battery as at lease one of the energy sources. Examples of the battery-equipped appliances include various home electric appliances, such as personal computers, cellular phones, battery-driven power tools, uninterruptive power supply devices, etc., as well as office appliances and industrial appliances.

A sixth aspect of the invention relates to a manufacture method for a battery-dedicated electrode foil that includes an aluminum electrode foil in which a metal aluminum is exposed, or which has on a metal aluminum an aluminum oxide layer whose film thickness is less than or equal to 3 nm, and a corrosion-resistant layer that is formed on a surface of the aluminum electrode foil, or is formed directly on a metal aluminum that forms the aluminum electrode foil, or is formed on the aluminum oxide layer, and that is made of a carbide or an oxide of at least one substance selected from the group consisting of tungsten, tantalum, hafnium, niobium, molybdenum, and vanadium. This manufacture method includes a corrosion-resistant layer formation step of forming the foregoing corrosion-resistant layer on the foregoing surface of the aluminum electrode foil.

In the manufacture method for the battery-dedicated electrode foil of the invention, the corrosion-resistant layer is formed on the surface of the aluminum electrode foil in which metal aluminum is exposed, or on the surface of the aluminum electrode foil that has an aluminum oxide layer whose thickness is less than or equal to 3 nm. Therefore, good electroconductivity between the aluminum electrode foil and the corrosion-resistant layer can be maintained, and a battery-dedicated electrode foil that is good in corrosion resistance can be certainly manufactured.

Examples of the corrosion-resistant layer formation step include physical vapor deposition (PVD) methods, such as sputtering, vacuum vapor deposition, ion plating, etc., and chemical vapor (CVD) deposition method (gas phase growth method). In particular, sputtering is preferable since sputtering achieves high film formation rate.

Furthermore, in the corrosion-resistant layer formation step, the corrosion-resistant layer may be formed directly on the metal aluminum that is exposed on the surface of the aluminum electrode foil.

As a result of this, direct electric conduction between the aluminum electrode foil and the corrosion-resistant layer can be established, and therefore a battery-dedicated electrode foil that can maintain better electroconductivity than an electrode foil having an intervening aluminum oxide layer can be manufactured.

In the corrosion-resistant layer formation step, the corrosion-resistant layer may be formed on the surface of the aluminum electrode foil that has on the surface an aluminum oxide layer whose film thickness is less than or equal to 3 nm. In this case, the resistance value in the thickness direction can be made sufficiently smaller than in the case where an aluminum foil whose aluminum oxide layer has a film thickness greater than 3 nm, as described above. Therefore, a battery-dedicated electrode foil in which good electroconductivity between the corrosion-resistant layer and the aluminum electrode foil is maintained can be manufactured.

Furthermore, as the corrosion-resistant layer, a carbide of at least one substance selected from the group consisting of tungsten, tantalum, hafnium, niobium, molybdenum and vanadium.

Since the corrosion-resistant layer is constructed of a carbide that has electroconductivity, a battery-dedicated electrode foil whose resistance is low can be manufactured.

As the corrosion-resistant layer, a carbide or an oxide of tungsten may be formed.

Since tungsten carbides or tungsten oxides have electroconductivity, battery-dedicated electrode foil whose resistance is low can be manufactured.

The foregoing manufacture method may further include a removal process of forming the aluminum electrode foil by removing, in a thickness direction of the aluminum foil, at least a portion of the aluminum oxide layer that is provided on a surface of the aluminum foil.

As a result of this, it is possible to certainly obtain the foregoing aluminum electrode foil for use in the corrosion-resistant layer formation step despite using a commonly available aluminum foil, such as an aluminum foil that has a naturally formed aluminum oxide layer of 5 nm or greater in thickness, or the like, and thus certainly manufacture the foregoing battery-dedicated electrode foil.

The foregoing removal process may be performed by physical etching through the use of an inert gas ion.

Since the physical etching through the use of an inert gas ion, that is, dry etching, removes at least a portion of the aluminum oxide layer of the aluminum foil in the thickness direction, the transition to the corrosion-resistant layer formation step of forming a corrosion-resistant layer is facilitated.

Examples of the physical etching through the use of an inert gas ion include plasma etching and sputter ion beam etching. Examples of the sputter ion beam etching of the foregoing etching processes include a technique of performing physical etching by sputtering through the use of an inert gas as the sputtering ion.

The removal process and the corrosion-resistant layer formation step may be continuously performed in a low-oxygen atmosphere in which the metal aluminum does not substantially oxidize.

As a result of this, the corrosion-resistant layer can be certainly formed on the exposed metal aluminum without a need to oxidize the exposed metal aluminum nor a need to thin the metal aluminum and thicken the aluminum oxide layer.

Incidentally, examples of the low-oxygen atmosphere in which metal aluminum does not substantially oxide include a vacuum of $10^{-1}$ Pa or lower.

A seventh aspect of the invention relates to a manufacture method for a positive electrode plate that includes a battery-dedicated electrode foil, and a positive electrode active material layer that contains a positive electrode active material and that is supported on a main surface of the battery-dedicated electrode foil. The battery-dedicated electrode foil is the foregoing battery-dedicated electrode foil, and the positive electrode active material layer contains the positive electrode active material made of a Li compound. This manufacture method includes a positive electrode active material layer formation step of forming the positive electrode active material layer on the main surface of the battery-dedicated electrode foil by applying to the main surface of the battery-dedicated electrode foil a water-based active material paste whose solvent is water and which contains the positive electrode active material made of the Li compound, and drying the water-based active material paste applied.

In the case where a water-based active material paste containing a Li compound is used, the water-based active material paste itself is a strong alkali due to the Li compound, and therefore, if the paste is applied to a battery-dedicated electrode foil, it is likely that the aluminum constituting the battery-dedicated electrode foil will be corroded to produce hydrogen gas and therefore a positive electrode active material layer containing a multiplicity of gaps therein will be formed. However, in the positive electrode plate manufacture method of the invention, since the battery-dedicated electrode foil used in the method is a battery-dedicated electrode foil as described above, that is, a battery-dedicated electrode foil provided with a corrosion-resistant layer, or with a corrosion-resistant layer and a diamond-like carbon coating formed on the corrosion-resistant layer, the use of the water-based active material paste does not corrode the battery-dedicated electrode foil, but allows formation of a dense and closely-packed positive electrode active material layer in which the formation of air spaces is restrained.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

DETAILED DESCRIPTION OF EMBODIMENTS (Embodiment 1) Embodiment 1 of the invention will be described with reference to the drawings. Firstly, a battery 1 in accordance with Embodiment 1 will be described. FIG. 1 is a perspective view of the battery 1, and FIG. 2 shows a partially cut-away cross-sectional view of the battery 1. The battery 1 in accordance with Embodiment 1 is a wound-type lithium-ion secondary battery that includes a power generation element 20, and an electrolyte solution 60. In this battery 1, the power generation element 20 and the electrolyte solution 60 are housed in a rectangular box-shape battery case 10. The battery case 10 has an battery case main body 11 and a sealing lid 12. Among the components of the battery case 10, the battery case main body 11 has a bottomed rectangular box shape, and a resin-made insulating film (not shown) is affixed to the entire inside surfaces of the battery case main body 11.

Figure 1:
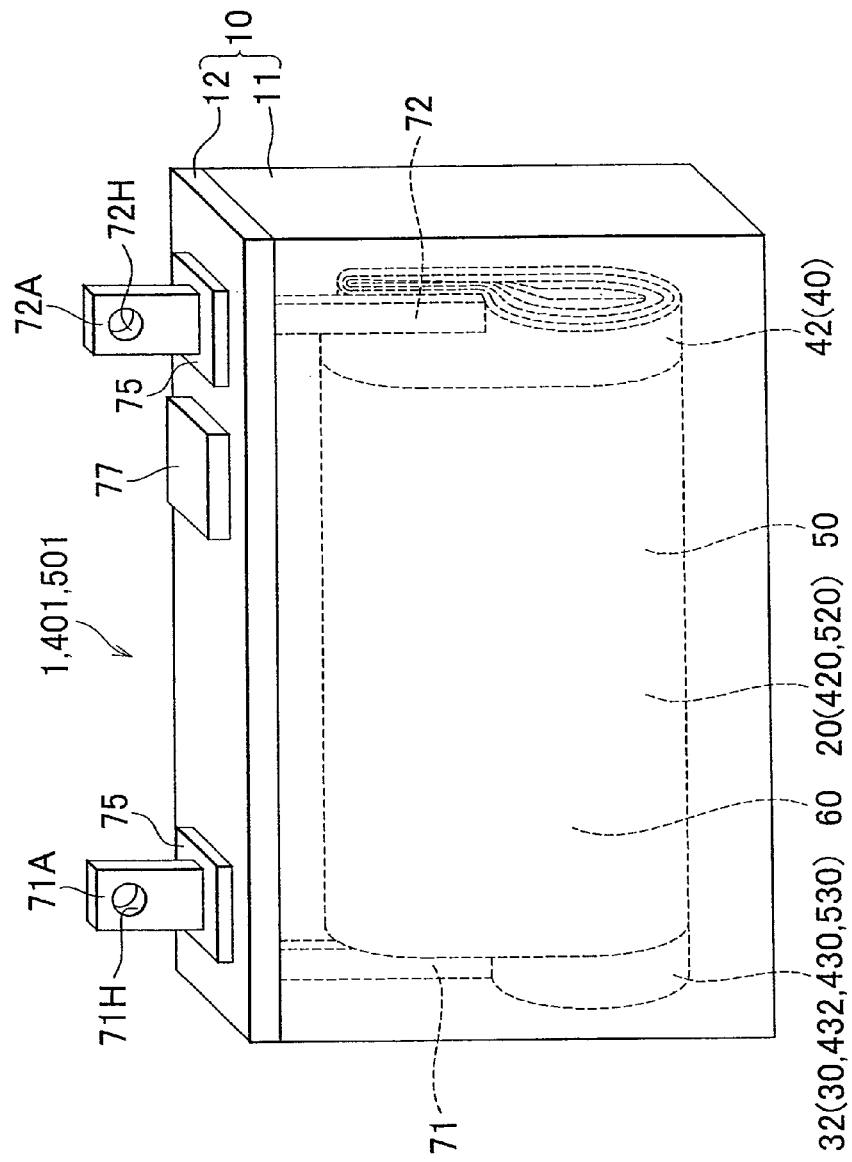
FIG. 1 is a perspective view of a battery in accordance with Embodiment 1, Modification 1, and Modification 2.
Figure 2:
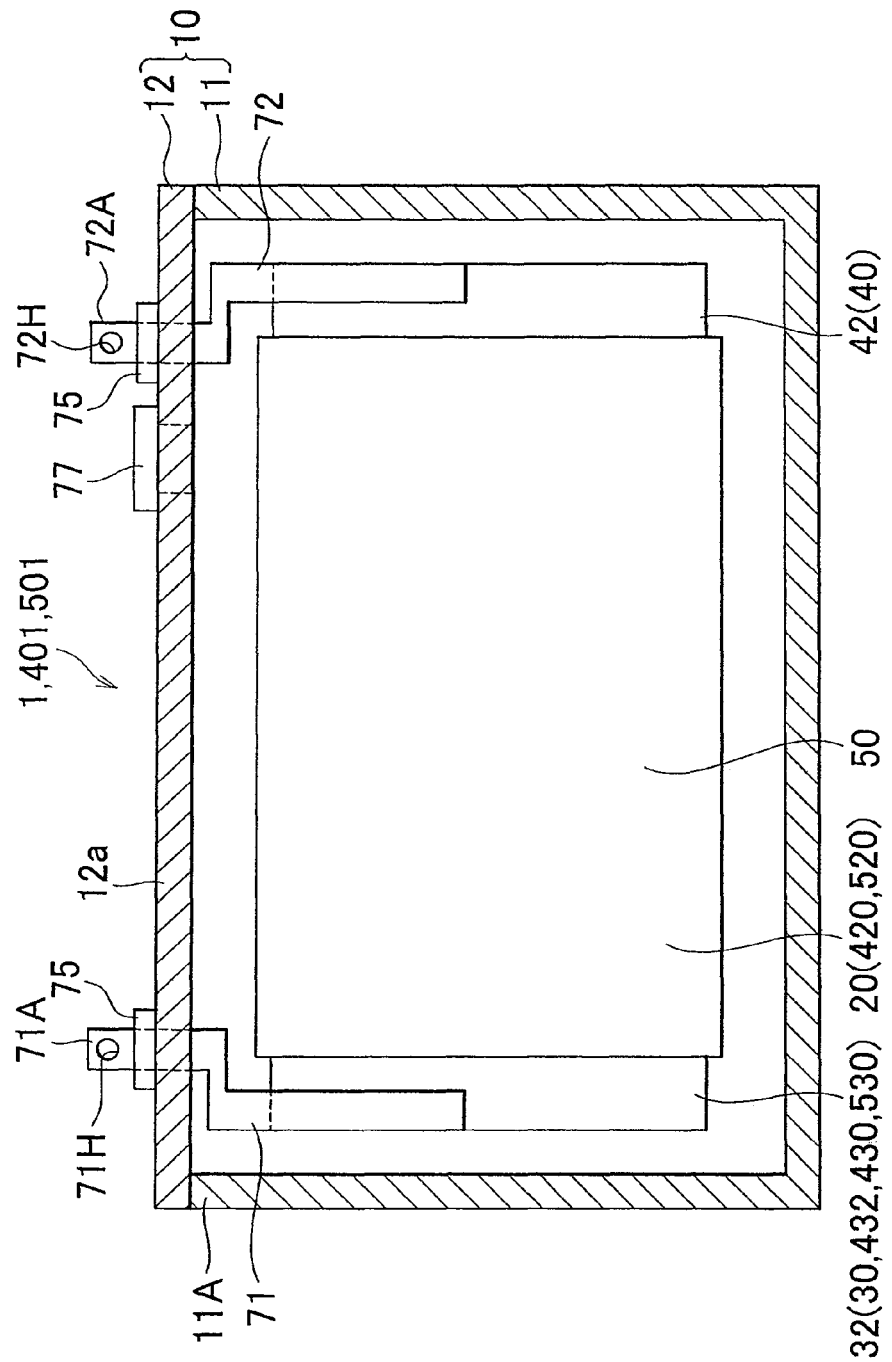
FIG. 2 is a sectional view of a battery in accordance with Embodiment 1, Modification 1, and Modification 2.

The sealing lid 12 has a rectangular platy shape, and closes an opening portion 11A of the battery case main body 11, and is welded to the battery case main body 11. The sealing lid 12 is penetrated by a positive collector member 71 and a negative collector member 72 that are connected to the power generation element 20 (described below), specifically, a positive terminal portion 71A and a negative terminal portion 72A that are distal end portions of the two collector members and that are protruded from an upper surface 12a of the sealing lid 12. The positive terminal portion 71A and the negative terminal portion 72A are insulated from the sealing lid 12 by resin-made insulation members 75. Besides, a rectangular platy safety valve 77 is sealingly attached to the sealing lid 12.

The electrolyte solution 60 (not shown) is an organic electrolyte solution obtained by adding $LiClO_4$ as a solute to a lithium ion concentration of 1 mol/l in a mixed organic solvent of ethylene carbonate (EC) and ethyl methyl carbonate (EMC) prepared at a volume ratio of EC:EMC=3:7. Generally, in lithium-ion secondary batteries, the use of a chlorine-based solute, such as $LiClO_4$, in the electrolyte solution will provide higher output than the use of a fluorine-based solute such as $LiPF_6$. Therefore, the battery 1 of Embodiment 1 is able to realize a high-output battery.

Besides, the power generation element 20 is made by winding up a belt-shape positive electrode plate 30 and a belt-shape negative electrode plate 40 so that the surface of the power generation element 20 has flat, together with an intervening belt-shape separator 50 made of polyethylene (see FIG. 1). The positive electrode plate 30 and the negative electrode plate 40 of the power generation element 20 are joined to the platy positive collector member 71 and the platy negative collector member 72, respectively, which are bent in a crank shape.

Figure 3:
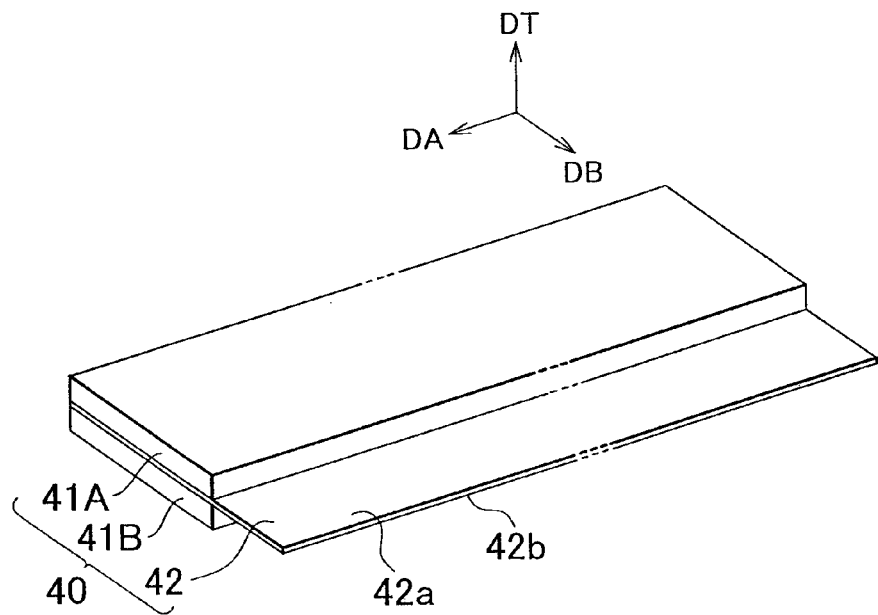
FIG. 3 is a perspective view of a negative electrode plate of Embodiment 1.

The negative electrode plate 40 of the power generation element 20, as shown in FIG. 3, has a negative electrode foil 42 that extends in a belt shape in a lengthwise direction DA and is made of copper, and a first negative electrode active material layer 41A and a second negative electrode active material layer 41B that are superposed on a first foil main surface 42a and a second foil main surface 42b, respectively, of the negative electrode foil 42. The negative electrode active material layers 41A, 41B each contain a graphite and a binder material (not shown).

Figure 4:
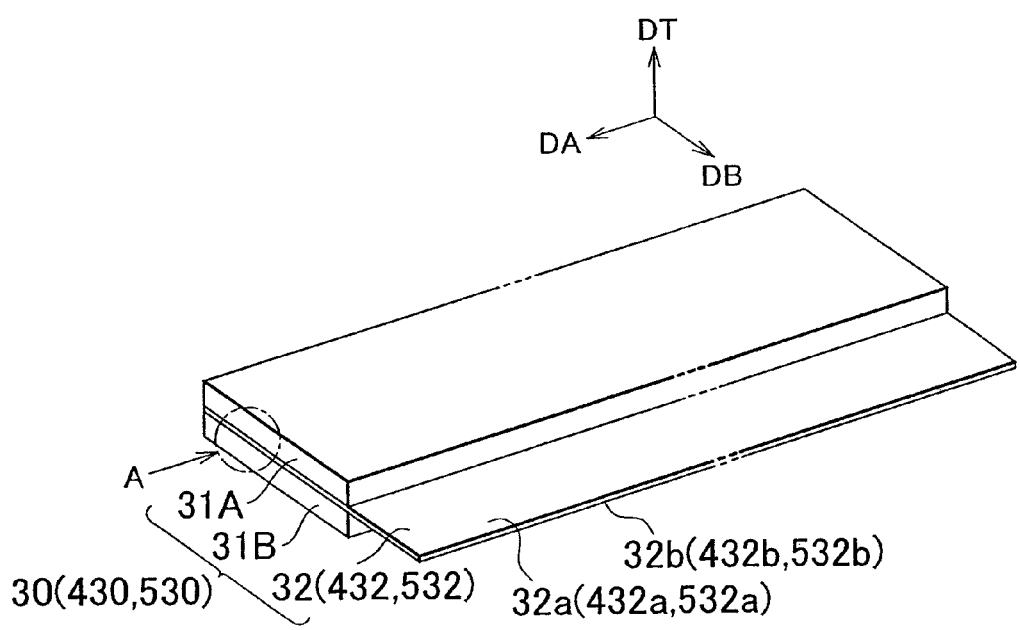
FIG. 4 is a perspective view of a positive electrode plate of Embodiment 1, Modification 1, and Modification 2.

Next, the positive electrode plate 30 constituting the power generation element 20 will be described. The positive electrode plate 30, as shown in FIG. 4, has a positive electrode foil 32 that extends in a lengthwise direction DA, and a first positive electrode active material layer 31A and a second positive electrode active material layer 31B that are supported on main surfaces (a first foil main surface 32a and a second foil main surface 32b, respectively) of the positive electrode foil 32. Incidentally, each of the first positive electrode active material layer 31A and the second positive electrode active material layer 31B is a dense positive electrode active material layer that does not contain many bubbles therein.

The first positive electrode active material layer 31A and the second positive electrode active material layer 31B each contain a positive electrode active material 31X made of $LiNiO_2$, acetylene black (AB, not shown), polytetrafluoroethylene (PTFE, not shown), and carboxyl methyl cellulose (CMC, not shown). Incidentally, the weight ratio of these components in each of the first and second positive electrode active material layers 31A, 31B is the positive electrode active material 31X:AB:PTFE:CMC=100:10:3:1. Incidentally, the first positive electrode active material layer 31A and the second positive electrode active material layer 31B are made by applying an active material paste 31P obtained by dispersing the foregoing layer materials in an ion-exchanged water to the first foil main surface 32a and the second foil main surface 32b of the positive electrode foil 32 and then drying the paste.

Figure 5:
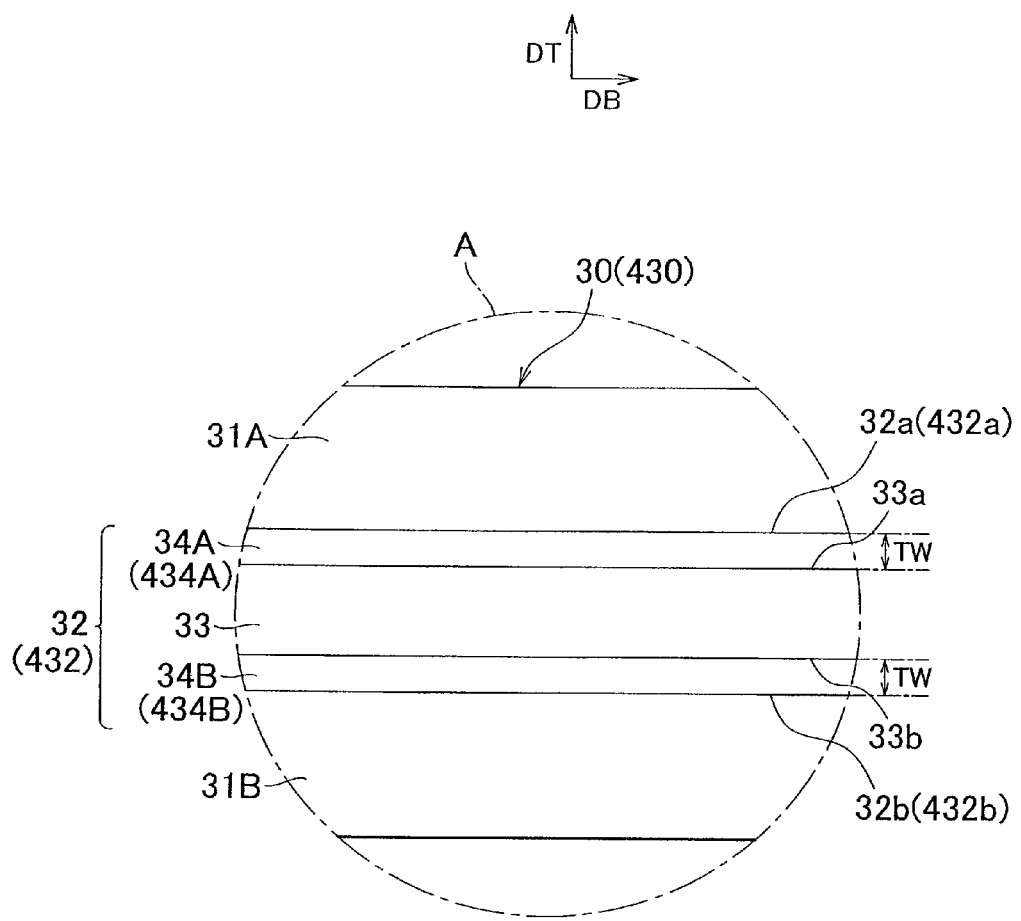
FIG. 5 is an enlarged end view (portion A in FIG. 4) of the positive electrode plate of Embodiment 1 and Modification 1.

The positive electrode foil 32 has an aluminum electrode foil (hereinafter, simply termed the aluminum foil) 33 that extends in a belt shape in the lengthwise direction DA and that is made of metal aluminum, and a first corrosion-resistant layer 34A and a second corrosion-resistant layer 34B supported on a first foil surface 33a and a second foil surface 33b, respectively, of the aluminum foil 33 (see FIG. 5). Each of the first corrosion-resistant layer 34A and the second corrosion-resistant layer 34B is made of tungsten carbide WC, and a layer thickness TW thereof in a thickness direction DT is 5 nm.

As for the aluminum foil 33, metal aluminum forming the foil directly contacts and supports the first corrosion-resistant layer 34A and the second corrosion-resistant layer 34B. Due to the property of metal aluminum, a passive-state film (an aluminum oxide layer) that is very thin (about 5 nm) is formed on the surface in the atmosphere. However, in the positive electrode foil 32 in Embodiment 1, the passive-state films formed on the first foil surface 33a and the second foil surface 33b of the aluminum foil 33 are removed to expose metal aluminum by a manufacture method (exposure step) described below. Then, after the exposure, the corrosion-resistant layers 34A, 34B are formed on the foil surfaces 33a, 33b. Therefore, in the positive electrode foil 32 in Embodiment 1, the corrosion-resistant layers 34A, 34B are in direct contact with the foil surfaces 33a, 33b of metal aluminum, without intervention of an aluminum oxide layer.

In order to grasp the property of the foregoing positive electrode foil 32, the present inventors fabricated batteries having the positive electrode foil on an experimental basis to inspect the capacity density of the batteries with various discharge currents. Concretely, 2032 type coin-shape batteries (hereinafter, also termed the batteries A) each employing in a positive electrode plate a positive electrode foil obtained by forming the first corrosion-resistant layer directly on the first foil surface of an aluminum foil where metal aluminum was exposed were fabricated. As examples comparative to the batteries A, batteries (hereinafter, also termed the batteries B) each employing a positive electrode foil with an aluminum oxide ($Al_2O_3$) layer of 5 nm in layer thickness formed on the first foil surface of the aluminum foil were fabricated. In addition, in these batteries, the positive electrode plates were formed by supporting equal volumes of positive electrode active material layers on the first corrosion-resistant layer side in the batteries A, and on the aluminum oxide layer side in the batteries B. Except for the materials of the positive electrode plates, all the batteries were fabricated in the same manner (e.g., metal lithium was used in the negative electrodes (counter electrodes)).

With respect to the batteries fabricated, a rated-current discharge test was performed. Concretely, under a temperature environment of 25° C., the batteries were discharged at a rated current from the fully charged state to a discharge end voltage (=3.0 V), and relations between the battery voltage and the battery capacity at various time points were obtained. Incidentally, each battery was evaluated with respect to the discharge currents of 1 C, 30 C, 50 C, and 100 C. Results regarding the batteries A and the batteries B are shown in FIG. 6 and FIG. 7, respectively.

Figure 6:
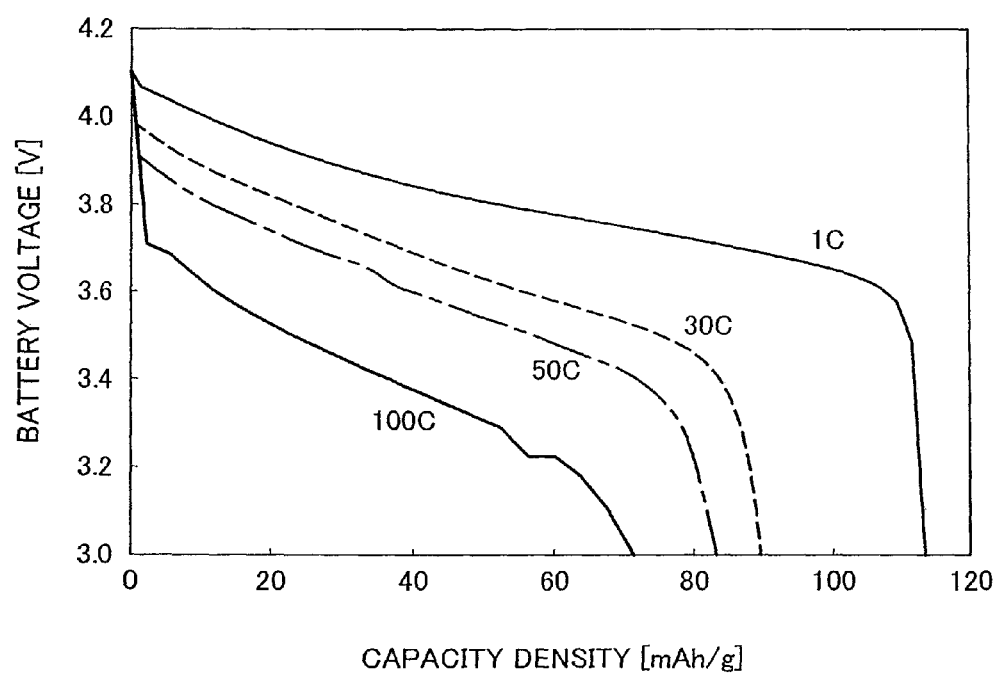
FIG. 6 is a graph showing a relation between the capacity density and the battery voltage.
Figure 7:
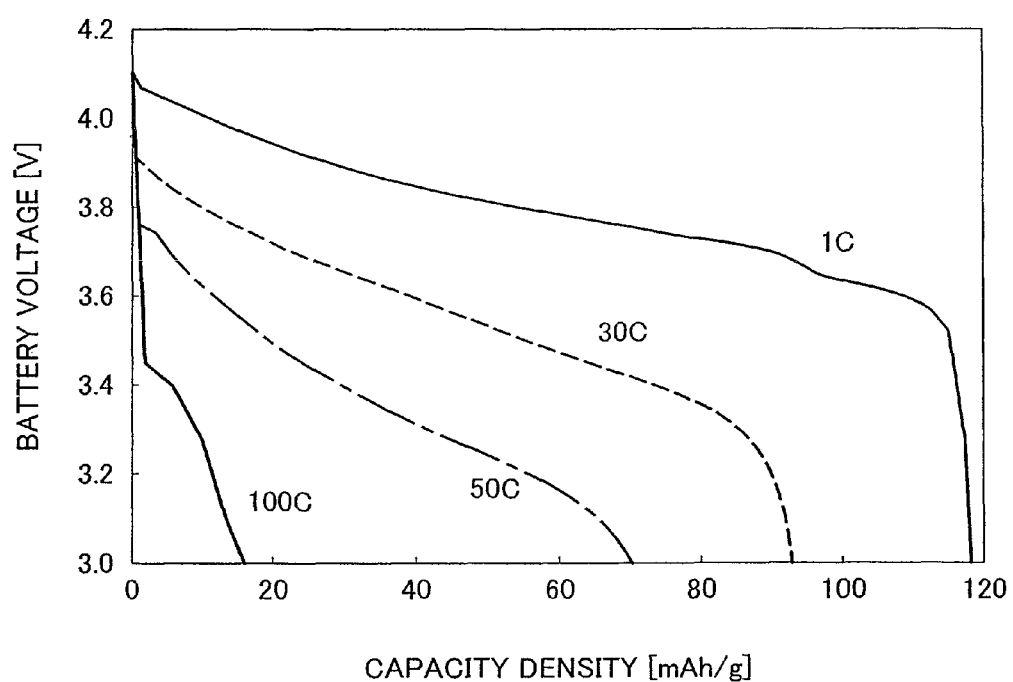
FIG. 7 is a graph showing a relation between the capacity density and the battery voltage.

The graphs of FIG. 6 and FIG. 7 each show the transition of the capacity density discharged at the various discharge currents. With the elapse of time during the test, the battery voltage decreased from the battery voltage (=4.1 V) at the time of the fully charged state toward the discharge end voltage (=3.0 V) while the battery capacity density increased. When the discharge current was set at 1 C, the batteries A and B both underwent linear gradual declines in battery voltage as shown in FIG. 6 and FIG. 7, respectively, and then underwent sharp reductions in battery voltage after the capacity density exceeded about 110 mAh/g. It can be seen in FIGS. 6 and 7 that the capacity densities of the batteries A and B at the time point at which the battery voltage reached 3.0 V were substantially the same.

However, when the discharge current was 30 C, differences between the graphs of the batteries A and B were seen. Firstly, in both batteries A and B, large declines in voltage appeared immediately after the discharge started. The amount of decline in battery voltage was smaller in the battery A (FIG. 6) than in the battery B (FIG. 7). As for the battery A (FIG. 6), the battery voltage sharply decreased to the vicinity of 3.95 V immediately after the start of discharge, and then linearly gradually decreased. On the other hand, in the battery B shown in FIG. 7, the battery voltage sharply decreased to the vicinity of 3.90 V immediately after the start of discharge. A reason for this difference (0.05 V) in the decrease in battery voltage is considered to be that the resistance that occurs in the corrosion-resistant layer interposed between the aluminum foil (metal aluminum) and the positive electrode active material layer in the battery A is smaller than the resistance that occurs in the aluminum oxide layer of 5 nm in film thickness interposed between the aluminum foil and the positive electrode active material layer in the battery B.

Furthermore, when the discharge current was even greater, that is, 50 C or 100 C, remarkable differences in the decline in battery voltage immediately following the start of discharge occur between the battery A and the battery B. That is, when the discharge current is 50 C, the battery voltage of the battery A declined to the vicinity of 3.90 V immediately following the start of discharge whereas the battery voltage of the battery B declined to the vicinity of 3.75 V immediately following the start of discharge. Besides, when the discharge current was 100 C, the battery voltage of the battery A declined to the vicinity of 3.70 V immediately following the start of discharge whereas the battery voltage of the battery B greatly declined to the vicinity of 3.44 V immediately following the start of discharge. In this manner, the battery A undergoes less declines in battery voltage immediately following the start of discharge than the battery B. Therefore, the capacity density at the time point at which the battery voltage reaches 3.0 V (discharge end voltage) can be made larger in the batter A than in the battery B. Concretely, the capacity density of the battery A at the battery voltage of 3.0 V with the discharge current of 50 C was about 83 mAh/g whereas the corresponding capacity density of the battery B was about 70 mAh/g. Besides, the capacity density of the battery A at the battery voltage of 3.0 V with the discharge current of 100 C was about 72 mAh/g whereas the corresponding capacity density of the battery B was as small as about 15 mAh/g. Thus, it can be understood that the battery A has larger capacity density than the battery B particularly when large current is discharged.

Next, in order to grasp the characteristics of tungsten carbide WC that constitutes the first corrosion-resistant layer 34A and the second corrosion-resistant layer 34B, the inventors carried out evaluation by cyclic voltammetry. Concretely, metal lithium was used for the reference electrode and the counter electrode, and tungsten carbide WC was used for the working electrode. Besides, an electrolyte solution obtained by adding $LiPF_6$ as a solute to a lithium ion concentration of 1 mol/L in a mixed organic solvent of ethylene carbonate (EC), dimethyl carbonate (DMC) and ethyl methyl carbonate (EMC) prepared at a volume ratio of EC:DMC:EMC=1:1:1 was used for the measurement (in this evaluation, $LiPF_6$, a common solute that dissociates to produce lithium ion, was used instead of the solute ($LiClO_4$) of the electrolyte solution 60 in accordance with Embodiment 1). In addition, during the measurement, the temperature of the electrolyte solution was kept at 50° C., the electric potential of the working electrode relative to the reference electrode began to be swept from 3.0 V, and one continuous reciprocation over the range of 3.0 V to 4.5 V was performed. Besides, the operation speed of sweeping the electric potential was 10 mV/s. The measurement by cyclic voltammetry was termed Experimental Example 1. Besides, as a comparative example, the measurement by cyclic voltammetry that was performed in substantially the same manner as in Experimental Example 1, except that the working electrode was made of metal tungsten, is termed Experimental Example 2. The measurement in Experimental Example 1 and Experimental Example 2 was repeatedly performed 100 times. Results of the measurement in Experimental Example 1 and Experimental Example 2 are shown in FIG. 8 and FIG. 9, respectively.

Figure 8:
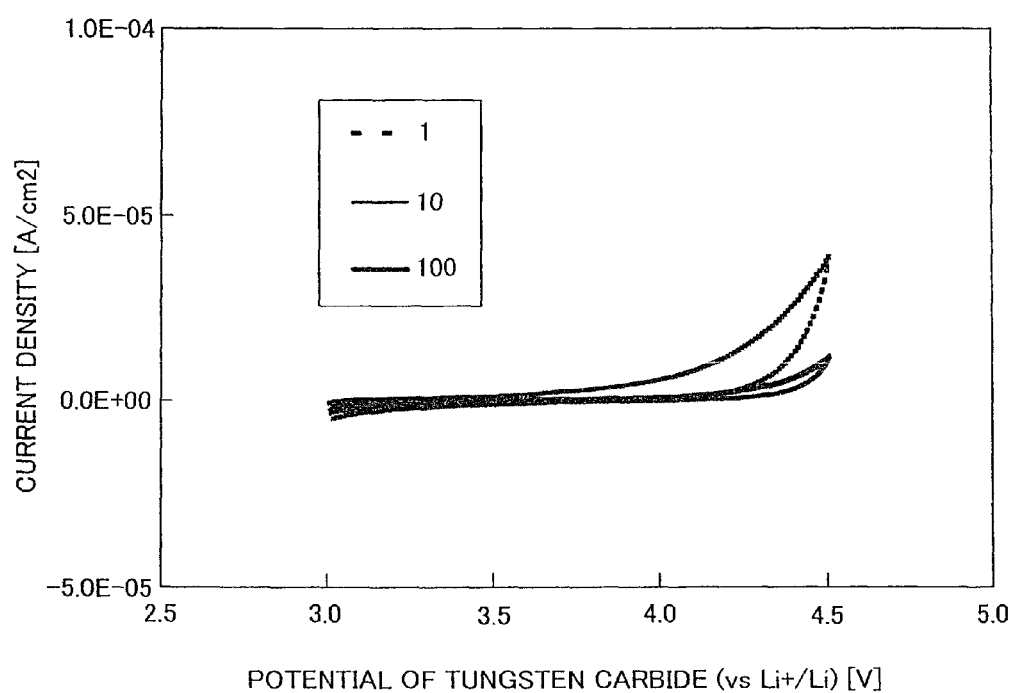
FIG. 8 is a graph showing the electric potential and the current density determined by cyclic voltammetry.
Figure 9:
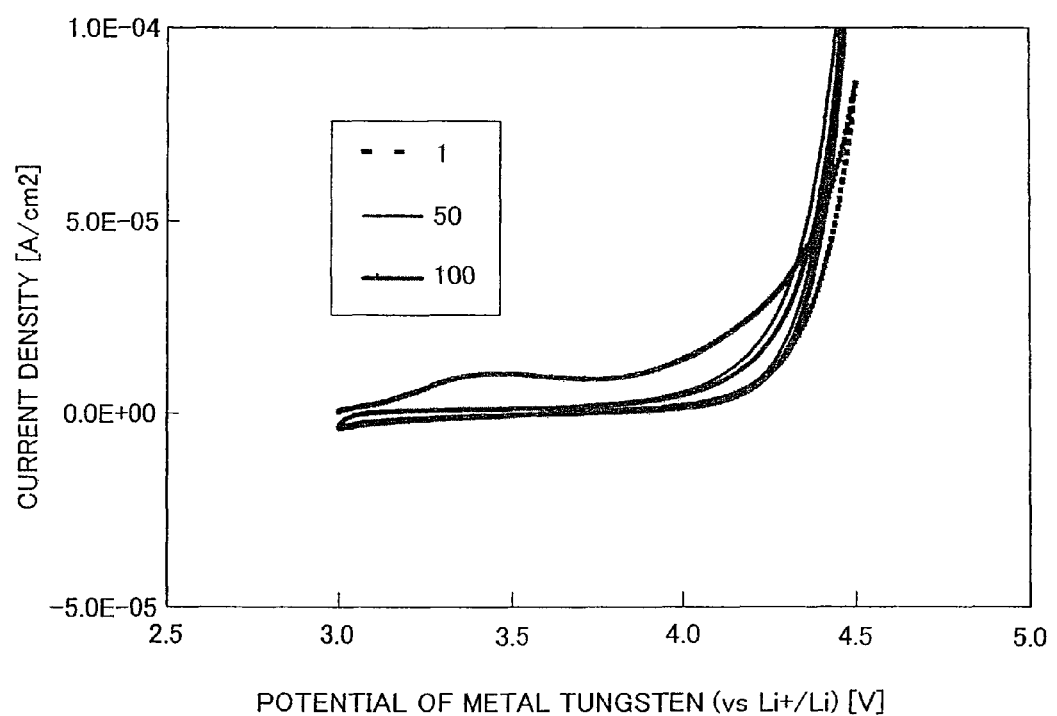
FIG. 9 is a graph showing the electric potential and the current density determined by cyclic voltammetry.

FIG. 8 and FIG. 9 both show the transition of the current density (current per unit area) relative to the electric potential of the working electrode. From the graph shown in FIG. 9, it can be understood that when the electric potential of the working electrode made of metal tungsten was greater than about 4.0 V, the current density sharply increased. Furthermore, this phenomenon occurred in substantially the same manner in the repeatedly performed measurements. A reason for this phenomenon is considered to be that as the electric potential of the working electrode relative to the reference electrode exceeds about 4.0 V, tungsten dissolves in the electrolyte solution to produce electrodes, so that current flows between the working electrode and the counter electrode. From this result, it can be understood that even if metal tungsten is used for the corrosion-resistant layer of the aluminum electrode foil, metal tungsten itself dissolves into the electrolyte solution when the electric potential of the positive electrode plate relative to the negative electrode plate exceeds about 4.0 V.

According to the graph in FIG. 8, on the other hand, in the case where tungsten carbide WC was used for the working electrode, the current density increased when the electric potential of tungsten carbide WC exceeded about 4.0 V, similarly to the foregoing case of metal tungsten, during the first round of the measurement. However, during the second and later rounds of the measurement, the current density hardly changed, but remained at values close to 0 A/cm² even when the electric potential of tungsten carbide WC exceeded about 4.0 V, unlike the first round of the measurement. This shows that the working electrode made of tungsten carbide WC does not dissolve into the electrolyte solution despite repeated charging and discharging. That is, it is shown that tungsten carbide WC has high corrosion resistance to Li ion and the like. Therefore, it can be understood that the positive electrode foil 32 of aluminum whose corrosion-resistant layer is made of tungsten carbide WC does not dissolve in the electrolyte solution 60 even when the electric potential of the positive electrode plate 30 relative to the negative electrode plate 40 exceeds 4.0 V.

As described above, the positive electrode foil 32 in accordance with Embodiment 1 has corrosion-resistant layers 34A and 34B that are made of the foregoing tungsten carbide WC. Therefore, the positive electrode foil 32 makes an electrode foil that is good in corrosion resistance and that is not easily corroded even when the positive electrode foil is given positive potential while in contact with the Li-containing electrolyte solution 60.

Furthermore, in the positive electrode foil 32 of Embodiment 1, the metal aluminum is in direct contact with the corrosion-resistant layers 34A, 34B. Therefore, compared with the case where aluminum oxide layers are formed on aluminum foil surfaces, better electroconductivity can be maintained between the positive electrode foil 32 and the positive electrode active material layers 31A, 31B formed on the foil main surfaces 32a, 32b (corrosion-resistant layers 34A, 34B) of the positive electrode foil 32. That is, tungsten carbide WC, which forms the corrosion-resistant layers 34A, 34B, has electroconductivity (specific conductivity of 17 μΩ·cm), and furthermore, the corrosion-resistant layers 34A, 34B are in direct contact with the metal aluminum that forms the aluminum foil 33. Therefore, the positive electrode foil 32 of Embodiment 1 makes a positive electrode foil 32 that reduces the resistance that occurs between the foil and the positive electrode active material layers 31A, 31B formed thereon.

In addition, since the corrosion-resistant layers 34A, 34B prevent corrosion of the aluminum foil 33, the positive electrode active material layers 31A, 31B can be formed without being corroded, for example, even in the case where the layers 31A, 31B are formed by applying to the positive electrode foil 32 a water-based active material paste 31P (described later) that contains a positive electrode active material made of a Li compound that makes the solvent strongly alkaline. Besides, since tungsten carbide WC is hydrophilic, the water-based active material paste 31P can be applied onto the corrosion-resistant layers 34A, 34B without being repelled, that is, can wet the application surfaces of the positive electrode foil 32 (corrosion-resistant layers 34A, 34B). Besides, good adhesion between the positive electrode active material layers 31A, 31B and the positive electrode foil 32 can be achieved.

Figure 10A:
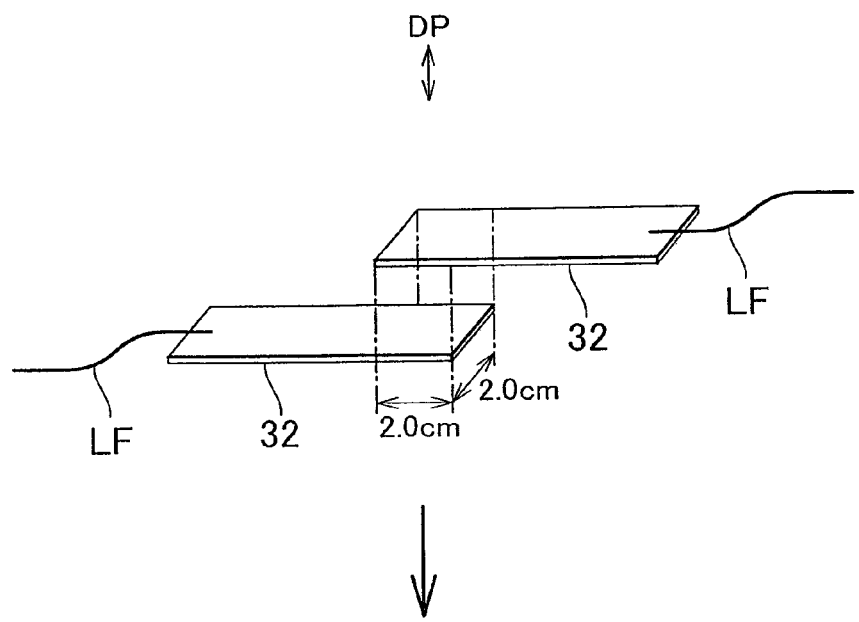
FIGS. 10A and 10B are illustrative diagrams showing the measurement of the value of resistance between positive electrode foils.
Figure 10B:
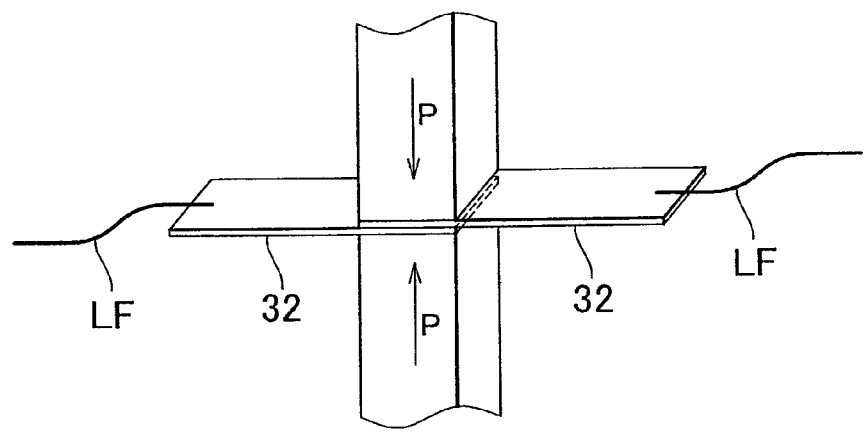

Besides, the inventors also measured the resistance that occurred between positive electrode foils 32 in contact in each of which corrosion-resistant layers 34A, 34B made of tungsten carbide WC are formed directly on the foil surfaces 33a, 33b of the aluminum foil 33. Concretely, as shown in FIG. 10A, two samples A (the layer thickness of the corrosion-resistant layers: 10 nm) each formed by joining a lead LF to a ribbon-shape positive electrode foil 32 that has been cut into a width of 2.0 cm were prepared, and then the two samples A were superimposed on each other so as to contact each other on contact faces of 2.0 cm×2.0 cm (see FIG. 10B). Furthermore, using a clamp device that has two flat surfaces that are able to press the contact faces of the positive electrode foils 32, the samples A are pressed against each other in the superimposition direction DP. The clamp device presses the contact faces with a clamping pressure P of 10 MPa/cm². Then, while the samples A were clamped by the clamp device, a current of 1.0 A was passed through each of the leads LF, LF thereof. From the then voltage, the value of the resistance occurring between the samples A was calculated to be 0.06 μΩ·cm². Besides, as a comparative example, samples B each formed by joining a lead to an aluminum foil that had on its surface an aluminum oxide layer (layer thickness: 5 nm) were also subjected to the measurement similar to the measurement with the samples A. The value of the resistance occurring between the samples B was calculated to be 8.44 m$\Omega\cdot$cm$^2$.

From the results, it can be understood that the value of the resistance between the samples A was lower than the value of the resistance between the samples B. That is, it can be understood that the resistance occurring between the aluminum foil 33 and the corrosion-resistant layers 34A, 34B of each of the positive electrode foils 32 that constitute the samples A is lower than the resistance that occurs between the aluminum foil and the aluminum oxide layers of each of the positive electrode foils that constitute the samples B. Therefore, in the positive electrode plate 30 in Embodiment 1, the positive electrode active material 31X in the positive electrode active material layers 31A, 31B supported on the foil main surfaces 32a, 32b of the positive electrode foil 32 can receive electrons from or pass electrons to the aluminum foil 33 at low resistance. That is, a low-resistance positive electrode plate 30 can be obtained, and therefore a battery 1 with low internal resistance can be realized.

Figure 11:
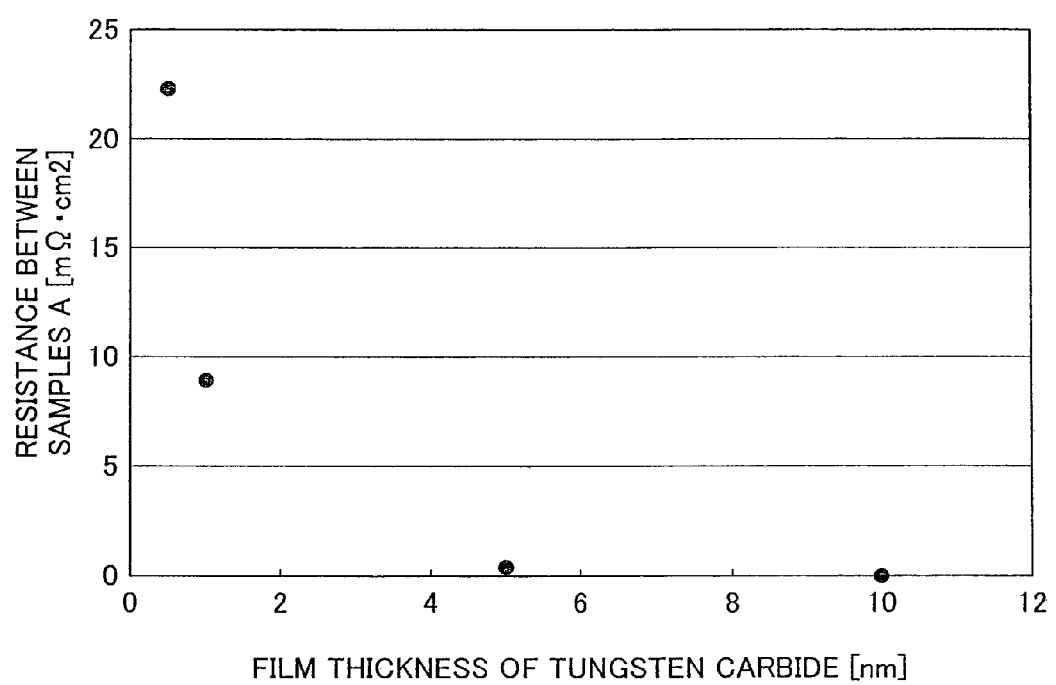
FIG. 11 is a graph showing a relation between the layer thickness of a corrosion-resistant layer and the value of resistance between positive electrode foils based on the measurement of the value of resistance between the positive electrode foils.

Furthermore, the inventors performed measurement similar to the above-described measurement, with regard to samples in which the corrosion-resistant layers 34A, 34B made of tungsten carbide WC that are formed directly on the foil surfaces 33a, 33b of the aluminum foil 33 had layer thicknesses of 0.5, 1.0, and 5.0. Results of the measurement of these samples and the samples A were that the resistance between the samples with the layer thickness of the corrosion-resistant layers 34A, 34B being 0.5 nm was 22.3 m$\Omega\cdot$cm$^2$, and that the resistance between the samples with the layer thickness being 1.0 nm was 8.87 m$\Omega\cdot$m$^2$, and that the resistance between the samples with the layer thickness being 5.0 nm was 0.39 m$\Omega\cdot$cm$^2$, and that the resistance between the samples with the layer thickness being 10 nm was 0.06 m$\Omega\cdot$cm$^2$. FIG. 11 shows a graph that represents a relation between the layer thickness of the corrosion-resistant layers and the resistance between the samples based on the foregoing values of the resistance. In addition, the inventors further measured the resistance between the samples that had corrosion-resistant layers which had a layer thickness of 10 nm, and which were made of substances other than the tungsten carbide. With the corrosion-resistant layers made of tantalum carbide TaC, the measured value of the foregoing resistance was 0.31 m$\Omega\cdot$cm$^2$. Other measured values of the foregoing resistance were 0.26 m$\Omega\cdot$cm$^2$ with the corrosion-resistant layers made of hafnium carbide HfC, 0.10 m$\Omega\cdot$cm$^2$ with the corrosion-resistant layers made of niobium carbide NbC, 0.09 m$\Omega\cdot$cm$^2$ with the corrosion-resistant layers made of molybdenum carbide Mo$_2$C, and 0.08 m$\Omega\cdot$cm$^2$ with the corrosion-resistant layers made of vanadium carbide VC.

It can be understood that the resistance between the samples A is high in the case where the layer thickness of the corrosion-resistant layers 34A, 34B directly formed on the foil surfaces of the aluminum foil 33 is thin, and that the resistance therebetween decreases with the increasing, layer thickness of the corrosion-resistant layers. From the graph shown in FIG. 11, it can be understood that if the layer thickness of .the corrosion-resistant layers is 3 nm or greater, the resistance between the samples A is sufficiently low, that is, the resistance occurring between the aluminum foil 33 and the corrosion-resistant layers 34A, 34B of the positive electrode foil 32 is sufficiently low. On the other hand, in the case where the layer thickness of the corrosion-resistant layers is increased to 100 nm or greater, the stress that occurs during the formation of the corrosion-resistant layers wrinkles the aluminum electrode foil, and it is difficult to form a flat battery-dedicated electrode foil. Therefore, it is advisable that the layer thickness be 3 to 90 nm. Furthermore, since increased thicknesses of the corrosion-resistant layers require increased time and cost in production, it is preferable that the layer thickness be, for example, within the range of 3 to 20 nm.

Besides, there is an advantage of the foil main surfaces 32a, 32b of the positive electrode foil 32 not being corroded even in the case where the active material paste 31P that forms the positive electrode active material layers 31A, 31B are applied to the positive electrode foil 32 at the stage where the positive electrode active material layers 31A, 31B are supported on the positive electrode foil 32. Therefore, it is possible to provide a positive electrode plate 30 in which the positive electrode active material layers 31A, 31B are stably supported on the positive electrode foil 32, and will not fall out therefrom. Besides, even when the positive electrode plate 30 contacts the electrolyte solution 60 at the stage where the positive electrode plate 30 is used in a battery 1, the foil main surfaces 32a, 32b of the positive electrode foil 32 are not corroded. Therefore, within the battery 1, the positive electrode active material layers 31A, 31B will not be corroded so as to fall out from the positive electrode foil 32, or problems, such as decomposition of the electrolyte solution 60, or the like, will not occur, so that the positive electrode plate 30 can be stably used.

In the case where the positive electrode active material 31X containing a Li compound (LiNiO$_2$) is prepared as an active material paste 31P by using an ion exchange water as a solvent as in Embodiment 1, the active material paste 31P itself becomes a strong alkali. Therefore, to form the positive electrode active material layers 31A, 31B, the strongly alkaline active material paste 31P is applied to the positive electrode foil 32. However, since the positive electrode plate 30 of Embodiment 1 employs the positive electrode foil 32, it does not happen that the active material paste 31P corrodes the metal aluminum of the aluminum foil 33, and therefore produces hydrogen gas. Therefore, it does not happen that many bubbles within the positive electrode active material layers 31A, 31B. Therefore, dense and closely packed positive electrode active material layers 31A, 31B can be formed.

Besides, in the battery 1 of Embodiment 1, the power generation element 20 contains the positive electrode plate 30. Therefore, even when the positive electrode plate 30 contacts the electrolyte solution 60 within the battery 1, the first and second foil main surfaces 32a, 32b of the positive electrode foil 32 are not corroded. Therefore, the battery 1 of Embodiment 1 prevents occurrence of problems, such as the fall-out of the positive electrode active material layers 31A, 31B from the positive electrode foil 32 due to corrosion within the battery 1, the decomposition of the electrolyte solution 60, etc. Furthermore, since the corrosion-resistant layers 34A, 34B are in contact with the aluminum foil 33 at low resistance, the positive electrode active material 31X in the positive electrode active material layers 31A, 31B supported on the foil main surfaces 32a, 32b of the positive electrode foil 32 can give electrons to and receive electrons from the aluminum foil 33 at low resistance. That is, a low-resistance positive electrode plate 30 can be provided, and a battery 1 whose internal resistance is low and through which large current can flow.

Besides, since the battery 1 of Embodiment 1 is a lithium-ion secondary battery, the electric potential of the positive electrode plate 30 (relative to Li ion) sometimes rises to the vicinity of 4.0 V, and the positive electrode foil 32 of the positive electrode plate 30 becomes apt to be oxidized. However, since the battery 1 of Embodiment 1, while being a lithium-ion secondary battery, employs the positive electrode foil 32, the positive electrode foil 32 is not oxidized during the use of the battery 1. Thus, the battery 1 can stably be used.

Besides, since tungsten carbide WC is used for the corrosion-resistant layers 34A, 34B of the positive electrode plate 30, the battery 1 can be used without the aluminum foil 33 being corroded by the electrolyte solution 60 that contains $LiClO_4$.

Figure 12:
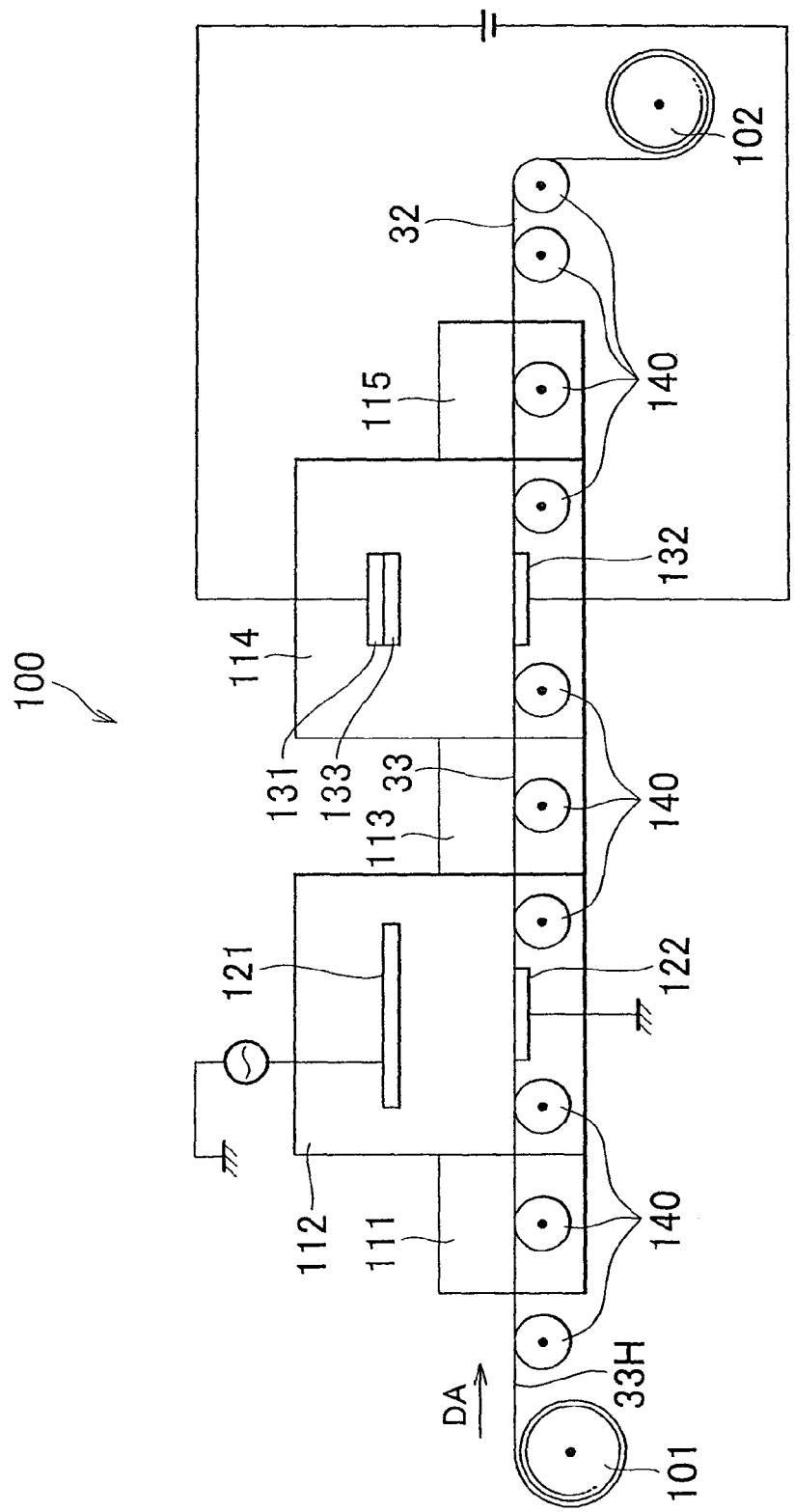
FIG. 12 is an illustrative diagram of a removal process and a corrosion-resistant layer formation process in Embodiment 1, Modification 1, and Modification 2.

Next, a manufacture method for the battery 1 in accordance with the embodiment will be described with reference to the drawings. FIG. 12 shows a schematic diagram of an apparatus 100 that carries out a process of removing the positive electrode foil 32, and a process of forming corrosion-resistant layers in the manufacture method for the battery 1. With regard to an aluminum foil 33 H that has an aluminum oxide layer whose film thickness is a natural thickness (about 5 nm) (hereinafter, also termed the pre-removal aluminum foil), the apparatus 100 removes the aluminum oxide layer by plasma etching under reduced pressure, and thus forms an aluminum foil 33 with metal aluminum exposed in the foil surfaces 33a, 33b, and subsequently forms corrosion-resistant layers by sputtering.

As shown in FIG. 12, the apparatus 100 is equipped with a first pressure reduction chamber 111, an etching chamber 112, a second pressure reduction chamber 113, a sputtering chamber 114, and a third pressure reduction chamber 115 that are contiguous to each other, as well as an aluminum-foil feed reel portion 101, an aluminum-foil take-up reel portion 102, a plurality of auxiliary rollers 140, and a conduction auxiliary roller 140N. Incidentally, the pre-removal aluminum foil 33H wound on the feed reel portion 101 has an aluminum oxide layer of about 5 nm in the layer thickness. Besides, the inlet opening for the aluminum foil 33 provided in each of the pressure reduction chambers 111, 113, 115, the etching chamber 112 and the sputtering chamber 114 has such a configuration as to be able to contain the reduced pressure or vacuum pressure within the corresponding chamber.

Of these chambers, the first pressure reduction chamber 111, the second pressure reduction chamber 113 and the third pressure reduction chamber 115 are each depressurized to about $10^{-1}$ Pa by a vacuum pump (not shown) disposed outside thereof. The depressurization of these chambers separates the etching chamber 112 and the sputtering chamber 114 (both described below) that are contiguous to the pressure reduction chambers, from the atmospheric pressure, and therefore can further reduce the pressure of the etching chamber 112 and the sputtering chamber 114. Besides, small amounts of argon gas are charged within the first pressure reduction chamber 111, the second pressure reduction chamber 113 and the third pressure reduction chamber 115 in order to restrain the oxidative reaction (formation of an aluminum oxide layer) of the aluminum foil 33 during process (in particular, between the removal process and the corrosion-resistant layer formation process).

Besides, in the etching chamber 112, there is disposed a parallel flat plate-type plasma etching device that has a flat platy first electrode 121, and a flat platy second electrode 122 parallel to the first electrode 121. In addition, this chamber is filled with argon gas at about $10^{-1}$ Pa. In the sputtering chamber 114, there is disposed a sputtering device that has a third electrode (negative electrode) 131 that supports a target 133F made of tungsten carbide WC, and a flat platy fourth electrode (positive electrode) 132. In addition, this chamber is filled with argon gas at about $10^{-1}$ Pa. In the sputtering chamber 114, corrosion-resistant layers are formed onto the foil surfaces 33a, 33b of the aluminum foil 33.

The pre-removal aluminum foil 33H is fed out of the feeder reel portion 101, and moves in a lengthwise direction DA via the auxiliary rollers 140. After passing through the first pressure reduction chamber 111 having a reduced-pressure argon atmosphere, the aluminum foil 33 is subjected to the removal process in the etching chamber 112. Concretely, in the argon gas atmosphere at a pressure of $10^{-1}$ Pa within the chamber, the pre-removal aluminum foil 33H having an aluminum oxide layer is brought into contact with the second electrode 122, at which Ar-etching is performed. The output of the first electrode 121 at this time is 200 W. Then, of the aluminum oxide layers 33H, the aluminum oxide layer facing the first electrode 121 is removed, so that an aluminum foil 33 in which metal aluminum is exposed is formed.

The aluminum foil 33 with metal aluminum exposed passes, from the etching chamber 112, through the second pressure reduction chamber 113 having a reduced-pressure argon atmosphere, and then moves into the sputtering chamber 114. In the sputtering chamber 114, the corrosion-resistant layer formation process is performed on the aluminum foil 33. Concretely, the pressure in the chamber is set at $3 \times 10^{-3}$ Pa, and an argon atmosphere is created by causing an argon gas to flow through the chamber at a flow rate of 11.5 sccm (sccm: amount of flow (cc) per unit minute at 1.013 Pa and 25° C.). The aluminum foil 33 is brought into contact with the fourth electrode 132, and direct-current electric power (200 W) is given between the third electrode 131 and the fourth electrode 132 to release tungsten carbide WC from the target 133F. In this manner, a first corrosion-resistant layer 34A made of tungsten carbide WC is formed on the first foil surface 33a of the aluminum foil 33.

After the foregoing corrosion-resistant layer formation process, the aluminum foil 33 passes through the third pressure reduction chamber 115, and then is wound up by the take-up reel portion 102. Next, using this apparatus 100 again, the same process as described above is repeated. Thus, a positive electrode foil 32 in which the first corrosion-resistant layer 34A is formed on the first foil surface 33a of the aluminum foil 33, and the second corrosion-resistant layer 34B is formed on the second foil surface 33b of the aluminum foil 33 is fabricated.

In the manufacture method for the battery 1 of Embodiment 1, the first corrosion-resistant layer 34A and the second corrosion-resistant layer 34B are formed directly on the first foil surface 33a and the second foil surface 33b, respectively, using the aluminum foil 33 in which metal aluminum is exposed in the first foil surface 33a and the second foil surface 33b. Therefore, since direct conduction of electricity between the aluminum foil 33 and the first corrosion-resistant layers 34A, and between the aluminum foil 33 and the second corrosion-resistant layer 34B, is possible, a positive electrode foil 32 in which better electroconductivity therebetween is maintained than in the case where aluminum oxide layers are interposed therebetween can be manufactured. Besides, a positive electrode foil 32 whose corrosion resistance is good can be certainly manufactured. Besides, since the first corrosion-resistant layer 34A and the second corrosion-resistant layer 34B are both formed from tungsten carbide WC, a positive electrode foil 32 in which the resistance that occurs between the first positive electrode active material layer 31A and the second positive electrode active material layer 31B is low can be manufactured.

Besides, in the manufacture method for the battery 1 of Embodiment 1, in the removal process in the etching chamber 112 prior to the corrosion-resistant layer formation process, the aluminum oxide layer of the pre-removal aluminum foil 33H is removed to form an aluminum foil 33 in which metal aluminum is exposed. Therefore, for example, although using an ordinarily available aluminum foil, such as an aluminum foil having a naturally formed aluminum oxide layer of 5 nm or greater in layer thickness, or the like, the foregoing aluminum foil 33 for use in the corrosion-resistant layer formation process can certainly be obtained, and thus a good positive electrode foil 32 can be manufactured.

Besides, in the etching chamber 112, the etching with ions of argon gas, which is an inert gas, that is, dry etching, removes the aluminum oxide layer of the pre-removal aluminum foil 33H in the thickness direction DT, therefore, the transition to the corrosion-resistant layer formation process is easy, that is, the corrosion-resistant layers 34A, 34B can easily be formed on the aluminum foil 33.

Besides, in the manufacture method, the removal process in the etching chamber 112 and the corrosion-resistant layer formation process in the sputtering chamber 114 are successively performed via the second pressure reduction chamber 113 having a pressure-reduced argon atmosphere. That is, since the removal process and the corrosion-resistant layer formation process are continuously performed during the passage through the etching chamber 112, the second pressure reduction chamber 113 and the sputtering chamber 114 whose atmospheres are each low in oxygen, the corrosion-resistant layers 34A, 34B can be certainly formed on the metal aluminum exposed on the aluminum foil 33, without oxidation of the exposed metal aluminum.

Figure 13:
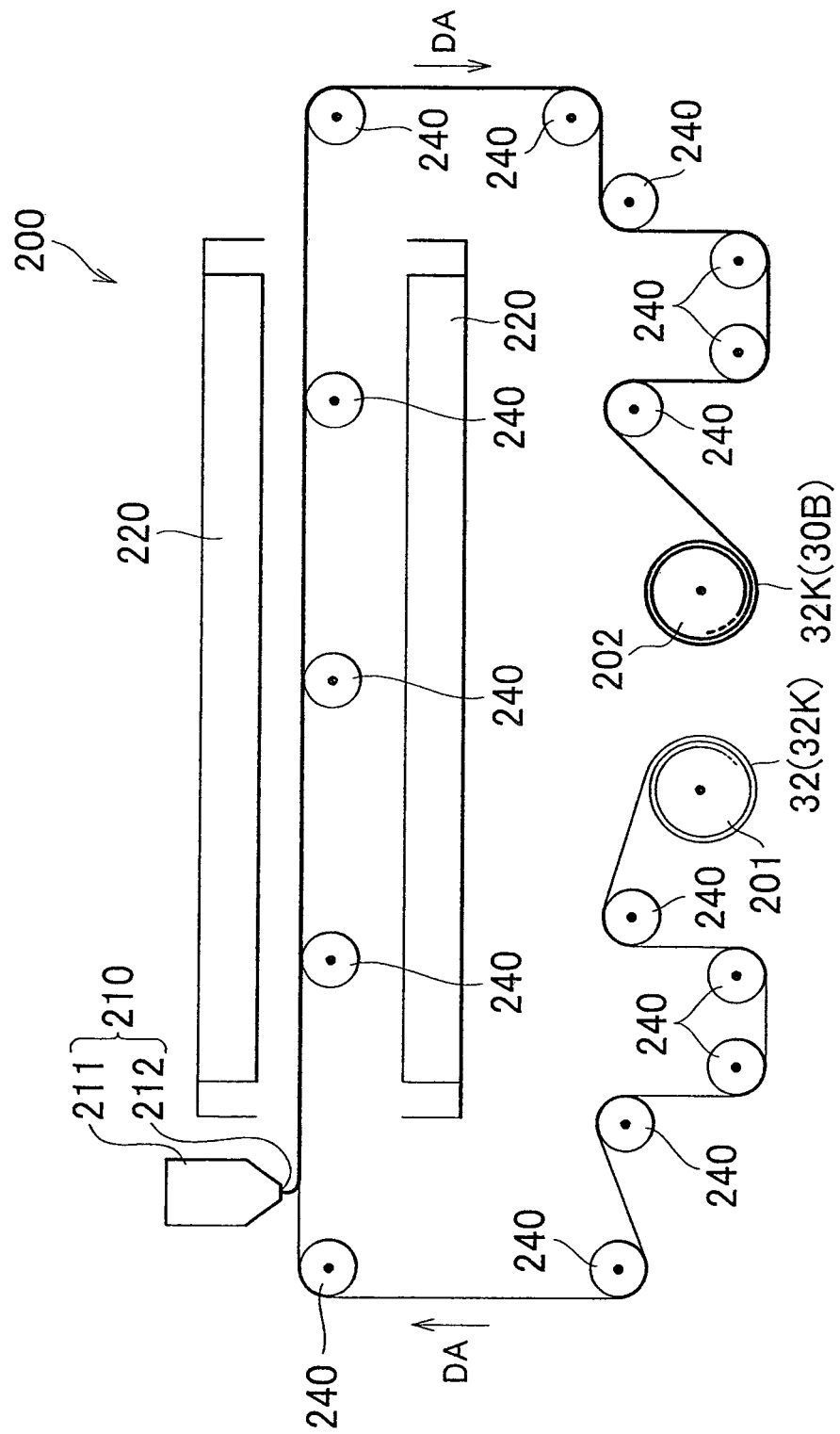
FIG. 13 is an illustrative diagram of a positive electrode active material formation process in Embodiment 1, Modification 1, and Modification 2.

Subsequently, a positive electrode active material-supporting process employing an application device 200 in the positive electrode active material formation process for the battery 1 will be described. The application device 200, as shown in FIG. 13, is equipped with a feed reel portion 201, a die 210, a drying furnace 220, a take-up reel portion 202, and a plurality of auxiliary rollers 240. Among these components, the die 210 has a metal-made paste holder portion 211 that holds therein an active material paste 31P, and an ejection opening 212 that continuously ejects the active material paste 31P held in the paste holder portion 211 to the first foil main surface 32a or the second foil main surface 32b of the positive electrode foil 32. The ejection opening 212 has a slit shape extending parallel to the width of the positive electrode foil 32 (in the direction of the depth in FIG. 13) so as to eject the active material paste 31P in a belt shape onto the first foil main surface 32a or the second foil main surface 32b of the positive electrode foil 32 moving in the lengthwise direction DA.

Incidentally, the active material paste 31P that the die 210 holds is a fluid formed by dispersing a positive electrode active material 31X constituted by $LiNiO_2$, acetylene black (AB, not shown), polytetrafluoroethylene (PTFE, not shown), and carboxyl methyl cellulose (CMC, not shown) in an ion-exchanged water and then kneading the dispersion. Besides, the weight ratio of the positive electrode active material 31X, the AB, the PTFE and the CMC contained in the active material paste 31P is the positive electrode active material 31X:AB:P E:CMC=100:10:3:1 as described above. In addition, since the active material paste 31P contains the positive electrode active material 31X constituted by $LiNiO_2$, the paste 31P exhibits a strong alkaline property.

Besides, the drying furnace 220 is able to feed hot wind toward the active material paste 31P applied onto the positive electrode foil 32. Therefore, the active material paste 31P applied to the positive electrode foil 32 gradually dries as the positive electrode foil 32 moves within the drying furnace 220. By the end of the passage through the drying furnace 220, the active material paste 31P becomes completely dry, that is, the moisture (ion-exchanged water) in the active material paste 31P has completely evaporated. Besides, the belt-shape positive electrode foil 32 moves in the lengthwise direction DA by the auxiliary rollers 240.

In the application device 200, firstly, the belt-shape positive electrode foil 32 wound on the feed reel portion 201 is moved in the lengthwise direction DA, and the active material paste 31P is applied to the first foil main surface 32a of the positive electrode foil 32 from the die 210. After that, the active material paste 31P is dried together with the positive electrode foil 32 in the drying furnace 220, and then a one-side loaded electrode foil 32K whose first foil main surface 32a has been loaded with a non-compressed positive electrode active material layer (not shown) is tentatively wound up on the take-up reel portion 202.

Next, using the application device 200 on the foregoing one-side loaded electrode foil 32K again, the active material paste 31P is applied to the second foil main surface 32b of the positive electrode foil 32. Then, the active material paste 31P is completely dried by the drying furnace 220. In this manner, a pre-press positive electrode plate 30B in which the non-compressed positive electrode active material layers (not shown) have been layered and disposed on the two foil main surfaces 32a, 32b of the positive electrode foil 32 is fabricated.

Incidentally, as described above, the water-based active material paste 31P itself is a strong alkali as described above. Therefore, for example, if the paste 31P is applied to an aluminum foil, it is likely that the metal aluminum constituting the aluminum foil will be corroded to produce hydrogen gas, and therefore that a positive electrode active material layer containing a multiplicity of spaces therein will be formed. However, in the manufacture method for the battery 1 in Embodiment 1, the positive electrode foil 32 employed is equipped with the corrosion-resistant layers 34A, 34B formed of tungsten carbide WC, so that, despite the use of the water-based active material paste 31P, the positive electrode foil 32 does not corrode. Thus, the water-based active material paste 31P applied to the positive electrode foil 32 forms dense positive electrode active material layers 31A, 31B in which the formation of gaps is restrained.

Figure 14:
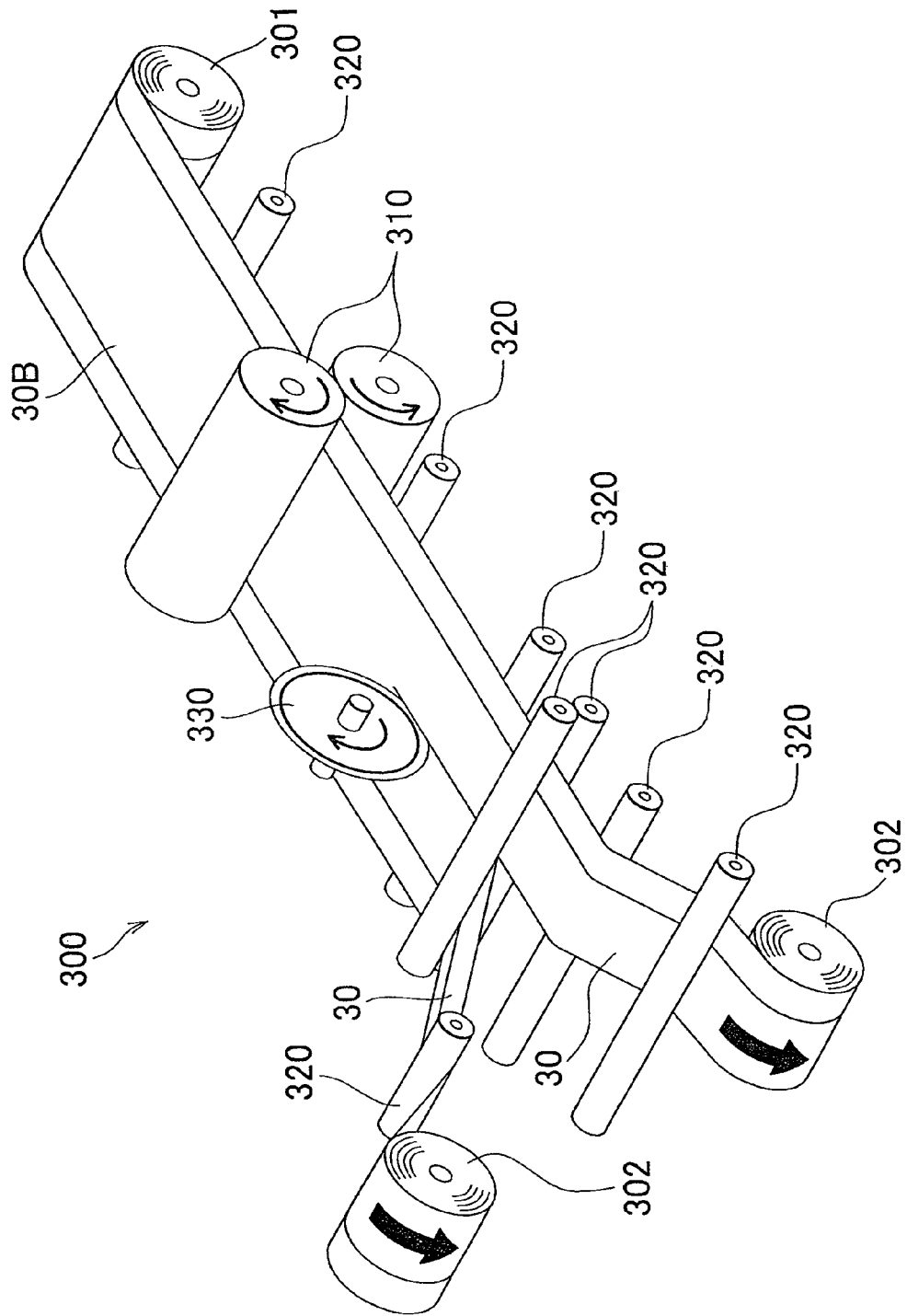
FIG. 14 is another illustrative diagram of the positive electrode active material formation process in Embodiment 1, Modification 1, and Modification 2.

Next, FIG. 14 shows a press-cut process that employs a press device 300 in the positive electrode active material formation process for the battery 1. The press device 300 is equipped with a feed reel portion 301, press rollers 310, take-up reel portions 302, a cutting blade 330, and a plurality of auxiliary rollers 320. This press device 300 is able to obtain the foregoing positive electrode plate 30 compressed in the thickness direction by passing the foregoing pre-press positive electrode plate 30B through a gap between the two press rollers 310 from the feed reel portion 301. After that, the positive electrode plate 30 is divided into two plates by cutting a center portion thereof with the cutting blade 330, and the two positive electrode plates 30 are wound up on the two take-up reel portions 302.

After the press-cut process is performed, each of the fabricated positive electrode plates 30 is wound up together with a negative electrode plate 40 separately prepared, with a separator 50 therebetween. Thus, the power generation element 20 is formed. Then, the positive collector member 71 and the negative collector member 72 are welded to the power generation element 20, and are together inserted into the battery case main body 11. After the electrolyte solution 60 is poured thereinto, the opening of the battery case main body 11 is sealed by welding the sealing lid 12 thereto. In this manner, the battery 1 is completed (see FIG. 1).

(Modification 1) A battery 401 in accordance with Modification 1 of the invention will be described with reference to the drawings. The battery 401 of Modification 1 is different from the foregoing battery of Embodiment 1 in that a first corrosion-resistant layer and a second corrosion-resistant layer that are made of tungsten trioxide are formed on the first foil surface and the second foil surface, respectively, of the aluminum electrode foil, and is substantially the same in the other respects. The differences of Modification 1 from Embodiment 1 will be mainly described below, and the description of substantially the same portions thereof as those of Embodiment 1 will be omitted or simplified. Incidentally, substantially the same portions bring about substantially the same operation and effects. Besides, the portions substantially the same in operation and the like are represented by the same reference characters in the drawings and the following description.

A battery 401 in accordance with Modification 1 is a wound-type lithium-ion secondary battery that includes a power generation element 420, and an electrolyte solution 60. Of these component elements, the power generation element 420 is made by winding up a belt-shape positive electrode plate 430 and a belt-shape negative electrode plate 40 that is substantially the same as that in Embodiment 1 so that the surface of the power generation element 420 has flat, together with an intervening belt-shape separator 50 made of polyethylene (see FIG. 1).

Of the component elements of the power generation element 420, the positive electrode plate 430, as shown in FIG. 4, has a positive electrode foil 432 that extends in a lengthwise direction DA, and a first positive electrode active material layer 31A and a second positive electrode active material layer 31B that are substantially the same as in Embodiment 1 and that are supported on main surfaces (a first foil main surface 432a and a second foil main surface 432b, respectively) of the positive electrode foil 432.

The positive electrode foil 432 has an aluminum electrode foil (hereinafter, simply termed the aluminum foil) 33 that extends in a belt shape in the lengthwise direction DA and that is made of metal aluminum, and a first corrosion-resistant layer 434A and a second corrosion-resistant layer 434B supported on a first foil surface 33a and a second foil surface 33b, respectively, of the aluminum foil 33 (see FIG. 5). Each of the first corrosion-resistant layer 434A and the second corrosion-resistant layer 434B is made of tungsten trioxide $WO_3$, and a layer thickness TW thereof in a thickness direction DT is 5 nm.

Incidentally, in the positive electrode foil 432 in Modification 1, the aluminum foil 33 in which metal aluminum is exposed on the foil surfaces 33a, 33b is formed by removing the aluminum oxide layer from the pre-removal aluminum foil 33H in substantially the same manner as in the foregoing manufacture method of Embodiment 1, and the corrosion-resistant layers 434A, 434B are formed on the foil surfaces 33a, 33b. Therefore, in the positive electrode foil 432, the corrosion-resistant layers 434A, 434B are in direct contact with the foil surfaces 33a, 33b of metal aluminum, without intervention of an aluminum oxide layer.

Figure 15:
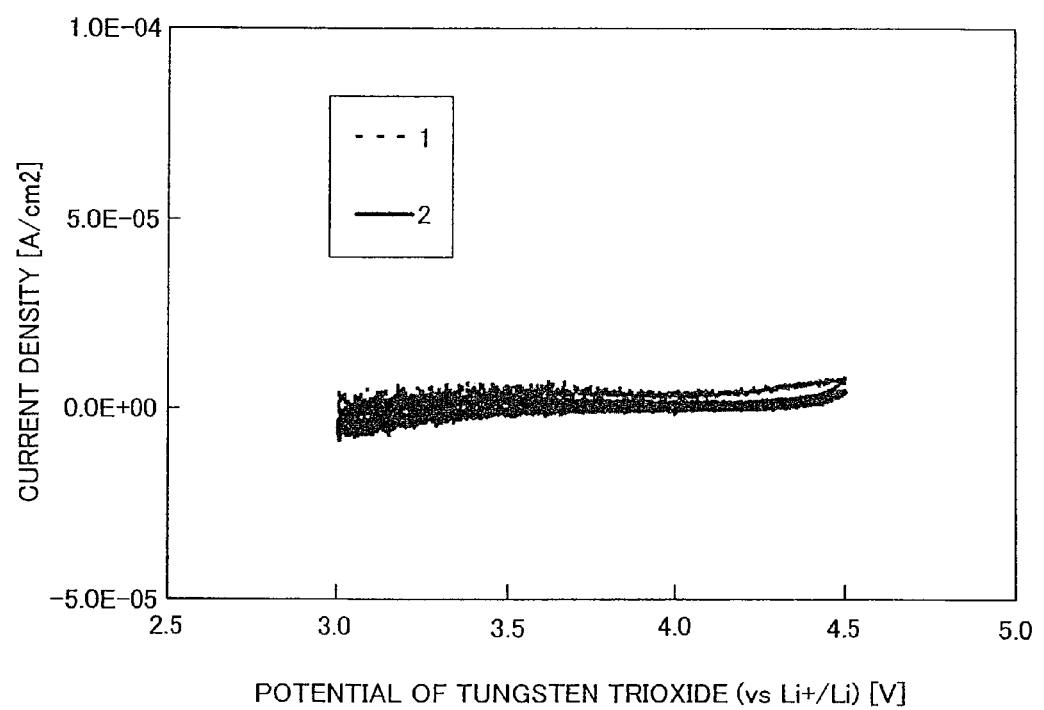
FIG. 15 is a graph showing the electric potential and the current density determined by cyclic voltammetry.

In order to grasp the characteristics of tungsten trioxide $WO_3$ that constitutes the first corrosion-resistant layer 34A and the second corrosion-resistant layer 34B, the inventors carried out evaluation by cyclic voltammetry in substantially the same manner as in Embodiment 1. Concretely, metal lithium was used for the reference electrode and the counter electrode, and tungsten trioxide $WO_3$ was used for the working electrode. The other conditions were the same as in Embodiment 1. The measurement by cyclic voltammetry is termed Experimental Example 3. The measurement in Experimental Example 3 was repeatedly performed 100 times. Results of the measurement in Experimental Example 3 are shown in FIG. 15.

As described in detail in conjunction with Embodiment 1, when the electric potential of the working electrode was greater than about 4.0 V, the current density sharply increased in Experimental Example 2 (see FIG. 9) in which the working electrode was made of metal tungsten. On the other hand, according to the graph of FIG. 15 showing the case where tungsten trioxide $WO_3$ was used for the working electrode, the current density hardly changed, but remained at values close to 0 $A/cm^2$ even when the electric potential of the tungsten trioxide $WO_3$ exceeded about 4.0 V in the first and later measurements. This shows that the working electrode made of tungsten trioxide $WO_3$ does not dissolve in the electrolyte solution despite repeated charging and discharging. That is, it is shown that tungsten trioxide $WO_3$ has high corrosion resistant to Li ion and the like. Therefore, it can be understood that the positive electrode foil 432 in which tungsten trioxide $WO_3$ is used for the corrosion-resistant layers of the aluminum electrode foil does not dissolve in the electrolyte solution 60 even when the electric potential of the positive electrode plate 430 relative to the negative electrode plate 40 exceeds 4.0 V.

As described above, the positive electrode foil 432 in accordance with Modification 1 is provided with the corrosion-resistant layers 434A, 434B made of tungsten trioxide $WO_3$. Therefore, the positive electrode foil 432 makes an electrode foil that is good in corrosion resistance and that is not easily corroded even when the positive electrode foil is given positive potential while in contact with the Li-containing electrolyte solution 60.

Furthermore, in the positive electrode foil 432 of Modification 1, the metal aluminum is in direct contact with the corrosion-resistant layers 434A, 434B. Therefore, compared with the case where layers of an oxide of aluminum, such as aluminum oxide layers, are formed on aluminum foil surfaces, better electroconductivity can be maintained between the positive electrode foil 432 and the positive electrode active material layers 31A, 31B formed on the foil main surfaces 432a, 432b (corrosion-resistant layers 434A, 434B) of the positive electrode foil 432. That is, tungsten trioxide $WO_3$, which forms the corrosion-resistant layers 34A, 34B, has electroconductivity (specific conductivity of 88 $\mu\Omega \cdot cm$), and furthermore, the corrosion-resistant layers 434A, 434B are in direct contact with the metal aluminum that forms the aluminum foil 33. Therefore, the positive electrode foil 432 of Modification 1 makes a positive electrode foil 432 that reduces the resistance that occurs between the foil and the positive electrode active material layers 31A, 31B formed thereon.

In addition, since the corrosion-resistant layers 434A, 434B prevent corrosion of the aluminum foil 33, the positive electrode active material layers 31A, 31B can be formed without being corroded, for example, even in the case where the layers 31A, 31B are formed by applying to the positive electrode foil 432 a water-based active material paste 31P that contains a positive electrode active material made of a Li compound that makes the solvent strongly alkaline. Besides, since tungsten trioxide $WO_3$ is hydrophilic, the water-based active material paste 31P can be applied onto the corrosion-resistant layers 434A, 434B without being repelled, that is, can wet the application surfaces of the positive electrode foil 432 (corrosion-resistant layers 434A, 434B). Besides, good adhesion between the positive electrode active material layers 31A, 31B and the positive electrode foil 432 can be achieved.

Next, a manufacture method for the battery 401 in accordance with Modification 1 will be described with reference to FIGS. 12 to 14. FIG. 12 shows a schematic diagram of an apparatus 100 that carries out a process of removing the positive electrode foil 32, and a process of forming corrosion-resistant layers in the manufacture method for the battery 1. This apparatus 100 is substantially the same as that used in Embodiment 1. However, the apparatus 100 in Modification 1 is different from the apparatus in Embodiment 1 in that tungsten trioxide $WO_3$ is used as the target for use in the sputtering chamber 114.

That is, the pressure in the sputtering chamber 114 is set at $3 \times 10^{-3}$ Pa, and an argon atmosphere is created by causing an argon gas to flow through the chamber at a flow rate of 11.5 sccm (sccm: amount of flow (cc) per unit minute at 1.013 Pa and 25° C.). The aluminum foil 33 is brought into contact with the fourth electrode 132, and direct-current electric power (200 W) is given between the third electrode 131 and the fourth electrode 132 to release tungsten trioxide $WO_3$ from the target 133s. In this manner, a first corrosion-resistant layer 434A made of tungsten trioxide $WO_3$ is formed on the first foil surface 33a of the aluminum foil 33. Then, using this apparatus 100 again, substantially the same process is repeated to fabricate the positive electrode foil 432 of Modification 1. After this corrosion-resistant layer formation process, substantially the same processes as in Embodiment 1 are performed (see FIGS. 13 and 14) to complete the battery 401 of Modification 1 (see FIG. 1).

(Modification 2) Next, a battery 501 in accordance with Modification 2 of the invention will be described with reference to the drawings. The battery 501 of Modification 2 is different from the battery 1 of Embodiment 1 in that a diamond-like carbon coating is formed on the positive electrode active material layers of a positive electrode plate, and is substantially the same in the other respects as the battery 1 of Embodiment 1. The differences of Modification 2 from Embodiment 1 will be mainly described below, and the description of substantially the same portions thereof as those of Embodiment 1 will be omitted or simplified. Incidentally, substantially the same portions bring about substantially the same operation and effects. Besides, the portions substantially the same in operation and the like are represented by the same reference characters in the drawings and the following description.

A battery 501 in accordance with Modification 2 is a wound-type lithium-ion secondary battery that includes a power generation element 520, and an electrolyte solution 60. Of these component elements, the power generation element 520 is made by winding up a belt-shape positive electrode plate 530 and a belt-shape negative electrode plate 40 so that the surface of the power generation element 520 has flat, together with an intervening belt-shape separator 50 made of polyethylene (see FIG. 1).

Of the component elements of the power generation element 520, the positive electrode plate 530, as shown in FIG. 4, has a DLC-coated positive electrode foil 532 that extends in a lengthwise direction DA, and a first positive electrode active material layer 31A and a second positive electrode active material layer 31B that are substantially the same as in Embodiment 1, and that are formed on main surfaces 532a, 532b, respectively, of the DLC-coated positive electrode foil 532.

Figure 16:
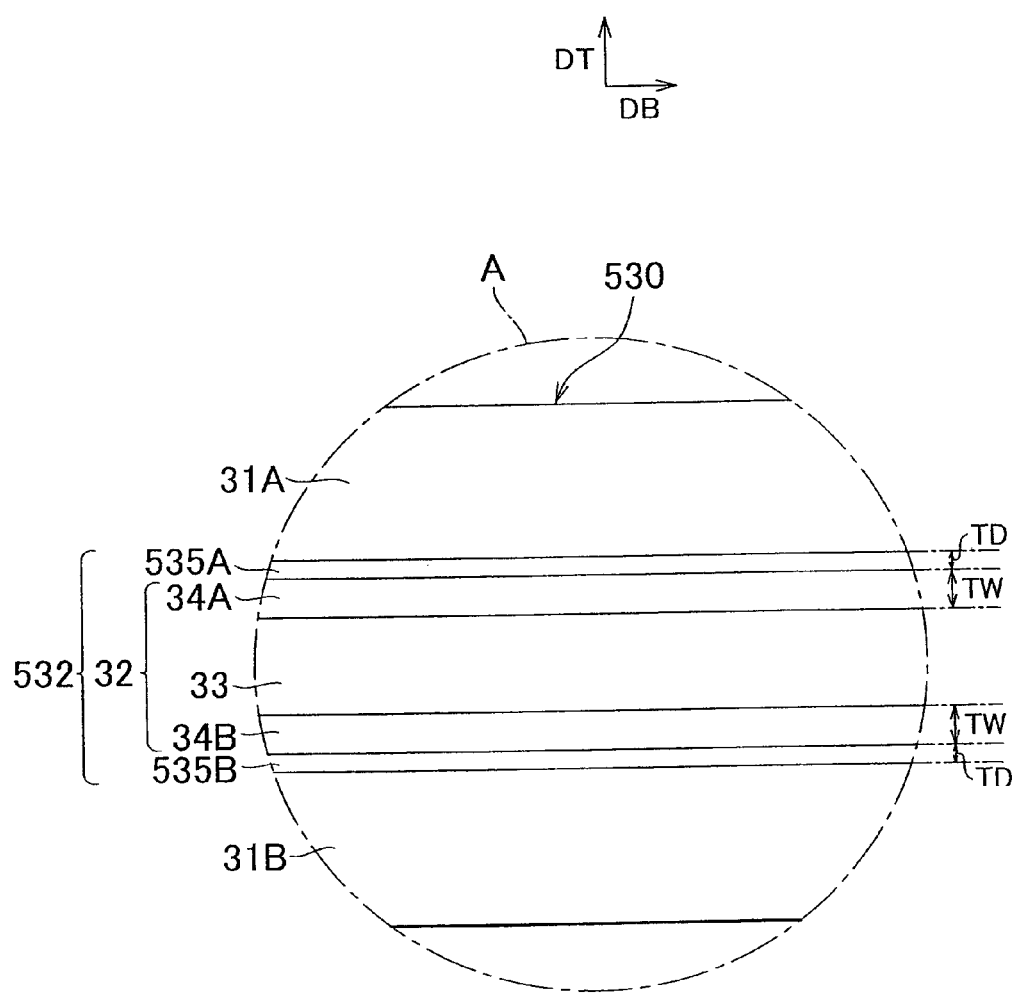
FIG. 16 is an enlarged view of an end surface of a positive electrode plate (portion A in FIG. 4) in Modification 2.

The DLC-coated positive electrode foil 532 has an aluminum foil 33, a first corrosion-resistant layer 34A, and a second corrosion-resistant layer 34B, as in Embodiment 1, and further has a first DLC coating 535A and a second DLC coating 535B that are made of diamond-like carbon and that coat the first corrosion-resistant layer 34A and the second corrosion-resistant layer 34B (see FIG. 16). The film thickness TD of each of the first DLC coating 535A and the second DLC coating 535B in a thickness direction DT is less than 50 nm and, concretely, is about 1 nm. Incidentally, the diamond-like carbon that forms the DLC coatings 535A, 535B is a hard coating made mainly of carbon and having SP2 or SP3 bonds which is formed by a DLC forming-process. The diamond-like carbon has high corrosion resistance.

Therefore, in the DLC-coated positive electrode foil 532 in Modification 2, the aluminum foil 33 can be more certainly restrained from being corroded by the electrolyte solution 60 or the active material paste 31P than in the positive electrode foil 32 in Embodiment 1. Incidentally, it is difficult to form a DLC coating on metal aluminum, which forms the aluminum foil 33, directly on the aluminum oxide layer without an intervening aluminum oxide layer since the adhesion therebetween becomes low. In Modification 2, however, due to the interposition of the corrosion-resistant layers 34A, 34B made of tungsten carbide WC, the DLC coatings 535A, 535B are strongly attached to the aluminum foil 33. Therefore, the DLC-coated positive electrode foil 532 thus provided is able to certainly retain good corrosion resistance. Therefore, the positive electrode plate 530 employing the DLC coating positive electrode foil 532 can make a positive electrode plate that stably supports thereon the positive electrode active material layers 31A, 31B without the positive electrode active material layers 31A, 31B falling apart from the DLC-coated positive electrode foil 532. Furthermore, since the DLC-coated positive electrode foil 532 in Modification 2 is formed so as to have a layer thickness of 1 nm, which is within the range of 0.5 to 50 nm, it is possible to provide an inexpensive battery-dedicated electrode foil that is easy to form and is free of the influence of the stress (e.g., formation of wrinkles) caused by the formation of the DLC coatings 535A, 535B.

Next, a manufacture method for the battery 501 in accordance with Modification 2 will be described with reference to FIGS. 12 to 14 and FIG. 17. Firstly, in substantially the same manner as in Embodiment 1, an aluminum oxide layer of a pre-removal aluminum foil 33H is removed by plasma etching to form an aluminum foil 33 in which metal aluminum is exposed on foil surfaces 33a, 33b. Subsequently, corrosion-resistant layers 34A, 34B are formed on the aluminum foil 33 by sputtering (see FIG. 12). Therefore, a positive electrode foil 32 in which the corrosion-resistant layers 34A, 34B are supported on the foil surfaces 33a, 33b of the aluminum foil 33 is completed.

Figure 17:
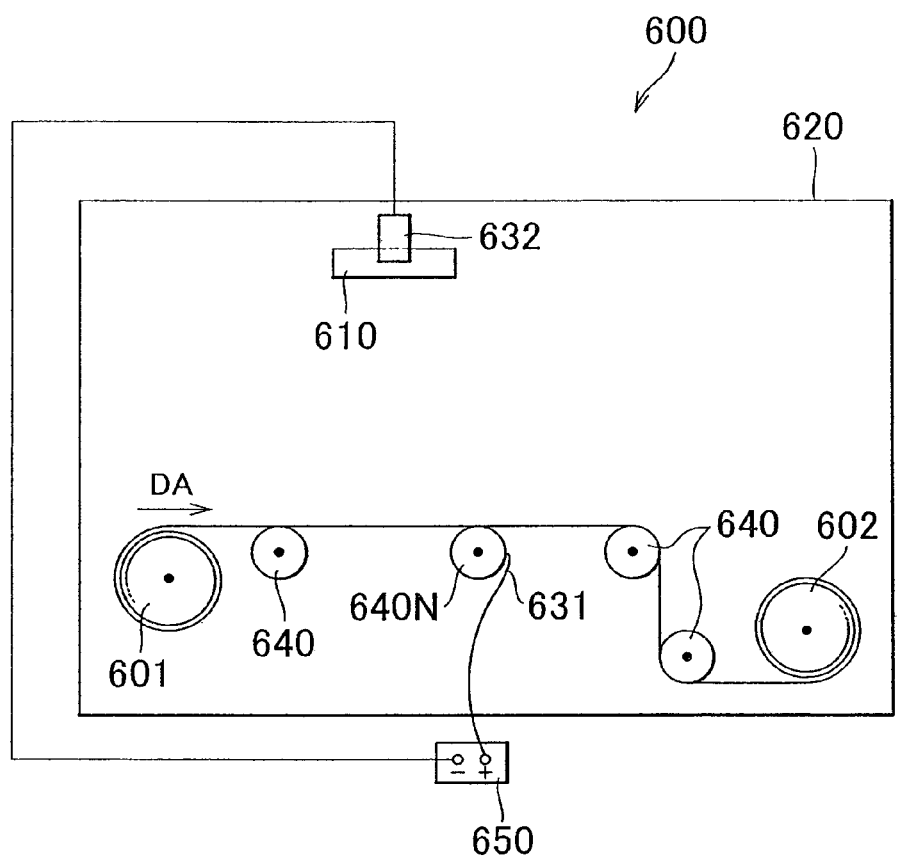
FIG. 17 is an illustrative diagram of the positive electrode active material formation process in Modification 2.

Next, a DLC formation process of forming DLC coatings 535A, 535B on the positive electrode foil 32 will be described. In this DLC formation process a two-electrode sputtering device 600 shown in FIG. 17 is used. The two-electrode sputtering device 600 has, within a vacuum vessel 620, a feeder reel portion 601 for the positive electrode foil 32, a take-up reel portion 602, an anode terminal 631, a target 610, an anode terminal 631, a cathode terminal 632, an electric power supply device 650, a plurality of auxiliary rollers 640, and a conduction auxiliary roller 640N.

Of these components of the device two-electrode sputtering device 600, the vacuum vessel 620 can be evacuated by a vacuum pump (not shown). After that, a small amount of argon gas is charged into the vacuum vessel 620. Besides, the positive electrode foil 32 is fed out from a feeder reel portion 601 within the vacuum vessel 620, and is moved in the lengthwise direction DA by the auxiliary rollers 640 and the conduction auxiliary roller 640N, and is wound up by a take-up reel portion 602. Of these components, the conduction auxiliary roller 640N is made of a metal, and is able to have electric conduction with the positive electrode foil 32. Since the anode or positive electrode terminal 631 of the electric power supply device 650 is electrically connected to the conduction auxiliary roller 640N, the entire positive electrode foil 32 obtains a positive potential if voltage is applied thereto through the use of the electric power supply device 650.

In the two-electrode sputtering device 600, voltage is applied through the use of the electric power supply device 650. Then, the positive electrode foil 32 is electrified with positive charge, and the target 610 made of graphite is electrified with negative charge. Then, carbon atoms CA deposit on the first foil main surface 32a (or the second foil main surface 32b) of the positive electrode foil 32, and therefore form the first DLC coating 535A (or the second DLC coating 535B).

After first DLC coating 535A (or the second DLC coating 535B) is formed on the first foil surface 32a (or the second foil main surface 32b) of the positive electrode foil 32, the second DLC coating 535B (or the first DLC coating 535A) is formed on the second foil main surface 32b (or the first foil main surface 32a) of the positive electrode foil 32 in the same manner. Thus, the DLC-coated positive electrode foil 532 in which the first and second DLC coatings 535A, 535B are formed on the two foil surfaces 32a, 32b of the positive electrode foil 32 is made. After the DLC formation process, the battery 501 of Modification 2 is completed (FIG. 1) in the same manner as in Embodiment 1 (see FIGS. 13 and 14). Incidentally, in Modification 2, after the positive electrode foil 32 is formed, the first and second DLC coatings 535A, 535B are formed in a separate process. However, another process may also be adopted in which after the first corrosion-resistant layer 34A is formed on the first foil surface 33a of the aluminum foil 33, the first DLC coating 535A is formed by a device similar to the foregoing two-electrode sputtering device 600 while the reduced pressure continues to be maintained, and then after the second corrosion-resistant layer 34B is formed on the second foil surface 33b of the aluminum foil 33, the second DLC coating 535B is formed while the reduced pressure is kept.

Figure 18:
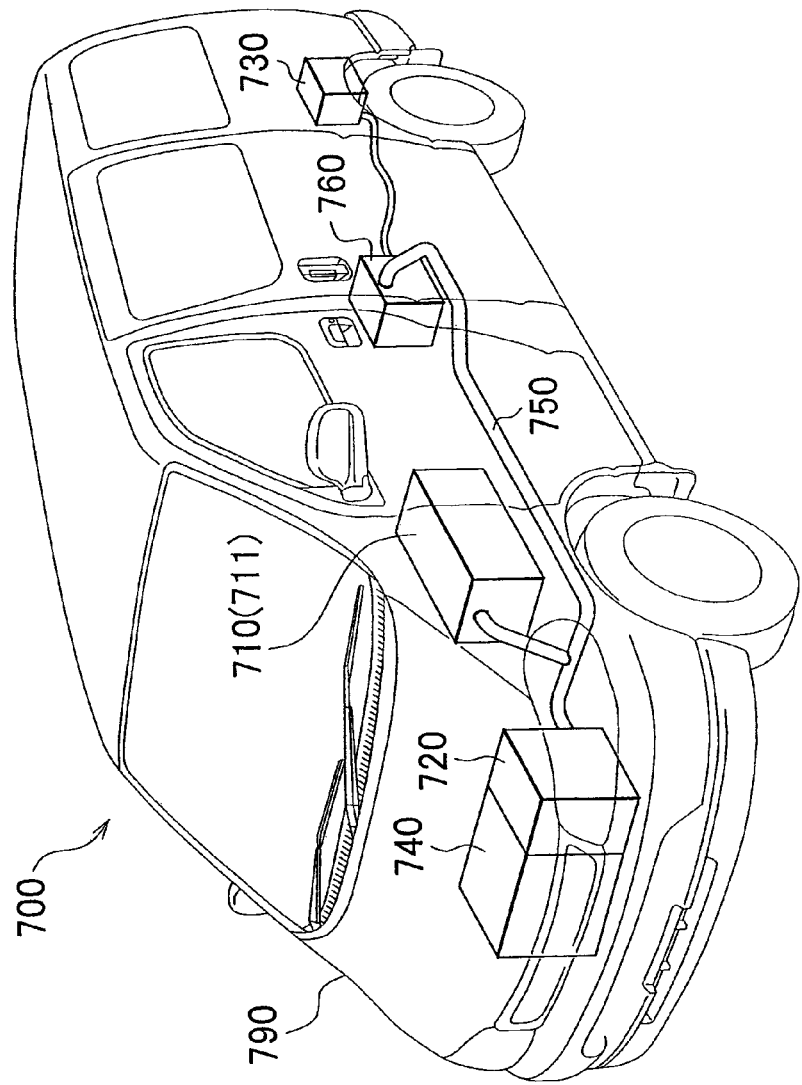
FIG. 18 is an illustrative diagram of a vehicle in accordance with Embodiment 2.

(Embodiment 2) A vehicle 700 in accordance with Embodiment 2 is equipped with a battery pack 710 that includes a plurality of batteries 1, 401, 501 described above. Concretely, as shown in FIG. 18, the vehicle 700 is a hybrid motor vehicle that drives itself through the use of an engine 740, a front electric motor 720 and the rear electric motor 730. This vehicle 700 has a vehicle body 790, the engine 740, the front motor 720 attached to the engine 740, the rear motor 730, a cable 750, an inverter 760, and the battery pack 710 having a rectangular box shape. Of these components, the battery pack 710 houses a plurality of batteries 1, 401, 501 described above within the rectangular box-shaped battery case 711.

Therefore, since the vehicle 700 in accordance with Embodiment 2 is equipped with the foregoing batteries 1, 401, 501, the vehicle can be provided with good traveling characteristic, and with stable performance.

Figure 19:
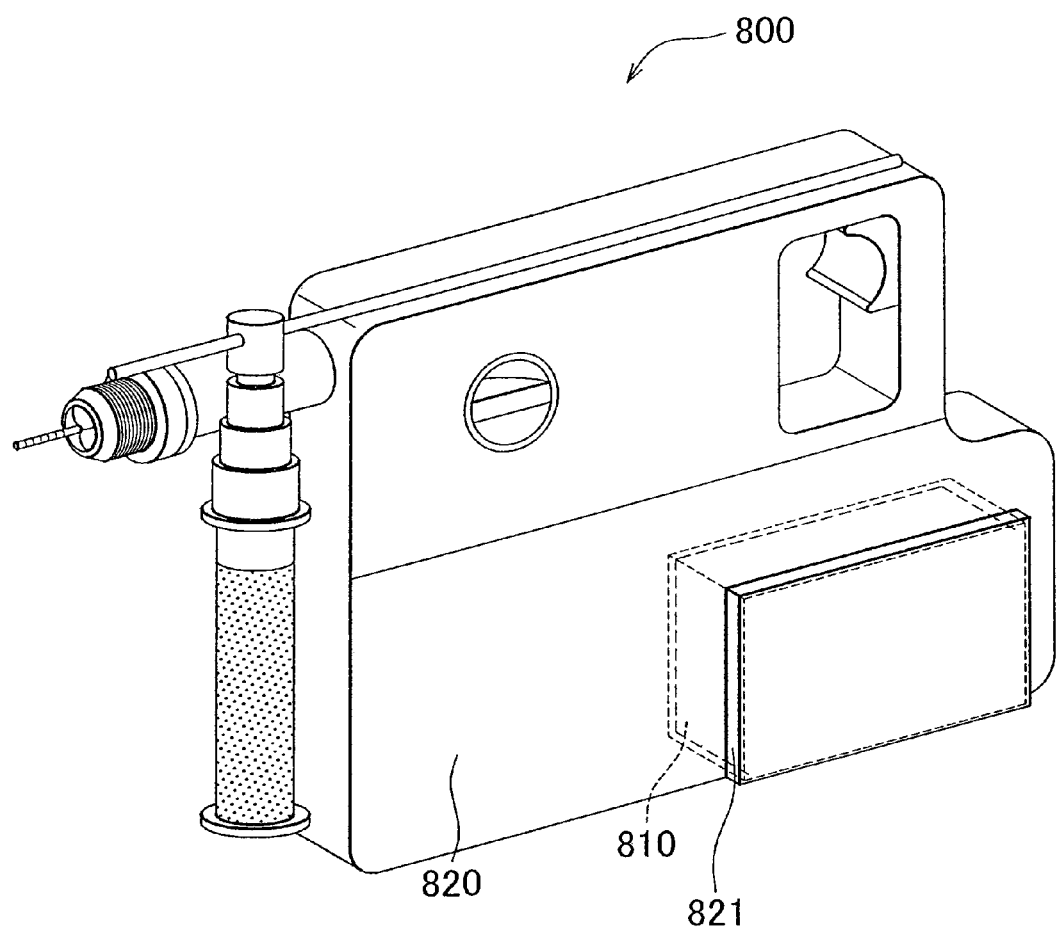
FIG. 19 is an illustrative diagram of a hammer drill in accordance with Embodiment 3.

(Embodiment 3) A hammer drill 800 in accordance with Embodiment 3 is provided with the battery pack 810 that includes the foregoing battery 1, 401, 501. The hammer drill 800 is a battery-equipped appliance that has the batteries 1, 401, 501, and a battery pack 810, as shown in FIG. 19. Incidentally, the battery pack 810 is detachably housed in a bottom portion 821 of a main body 820 of the hammer drill 800.

Therefore, since the hammer drill 800 in accordance with Embodiment 3 is equipped with the foregoing battery 1, 401, 501, a battery-equipped appliance with good characteristics for the use of the hammer drill and also with stable performance can be provided.

While the invention has been described above with reference to Embodiments 1, 2 and Modifications 1, 2, it is to be understood that the invention is not limited to the foregoing embodiments or the like, but may be applied with appropriate modifications without departing from the gist of the invention. For example, although in Embodiment 1, the battery case of the battery is a rectangular container, the case may also be a cylindrical container, or a laminate-type container. Besides, in Embodiment 1 and Modification 1, the corrosion-resistant layers of the battery-dedicated electrode foil are made of tungsten carbide WC or tungsten trioxide $WO_3$. However, the corrosion-resistant layers may also be made of a tungsten carbide such as $W_3C$ or the like other than WC, a tantalum carbide such as TaC or the like, a hafnium carbide such as HfC or the like, a niobium carbide such as $Nb_2C$, NbC or the like, or a vanadium carbide such as VC or the like. Besides, the material of the corrosion-resistant layers may also be a tungsten oxide such as $W_2O_3$ or the like other than $WO_3$, a tantalum oxide such as $TaO_2$ or the like, a hafnium oxide such as $HfO_2$ or the like, a niobium oxide such as NbO, $Nb_2O_5$ or the like, or a vanadium oxide such as VO, $V_2O_3$, $VO_2$ or the like.

Besides, although in Embodiment 1, the aluminum oxide layer of the pre-removal aluminum foil 33H is removed by plasma etching in the manufacture of the battery-dedicated electrode foil, the aluminum oxide layer may also be removed through the use of, for example, sputter ion beam etching. Incidentally, examples of the sputter ion beam etching include a technique of performing the physical etching by sputtering through the use of an inert gas as the ion. Besides, although the corrosion-resistant layers are formed by sputtering in the manufacture of the battery-dedicated electrode foil, the method of forming the corrosion-resistance layers may also be other than sputtering, for example, a physical vapor deposition (PVD) method, such as vacuum vapor disposition, ion plating, etc., or a chemical vapor deposition (CVD) method (gas phase growth method).

Besides, although in Embodiment 1 and the like, the positive electrode active material 31X contains $LiNiO_2$, the positive electrode active material 31X may also be another lithium-containing transition metal oxide other than $LiNiO_2$, for example, $LiCoO_2$, $LiMn_2O_4$, $LiMnO_2$, $LiCo_{0.5}Ni_{0.5}O_2$, $LiNi_{0.7}Co_{0.2}Mn_{0.1}O_2$, etc. Furthermore, although in Embodiment 1, the solute of the electrolyte solution 60 is $LiClO_4$, the solute may also be, for example, $LiPF_6$, $LiCF_3SO_3$, $LiAsF_6$, $LiBF_4$, etc.

The invention claimed is:

1. A positive electrode plate comprising:
a battery-dedicated electrode foil which comprises
an aluminum electrode foil in which metal aluminum is exposed, or which has on metal aluminum an aluminum oxide layer of 3 nm or less in film thickness; and
a corrosion-resistant layer on a surface of the aluminum electrode foil, and being in direct contact with the metal aluminum of the aluminum electrode foil, or in contact with the aluminum oxide layer, the corrosion-resistant layer being made of a carbide of at least one substance selected from the group consisting of tungsten, tantalum, hafnium, niobium, molybdenum, and vanadium, wherein a thickness of the corrosion-resistant layer is 3 nm to 90 nm; and
a positive electrode active material layer that contains a positive electrode active material and that is supported on a main surface of the battery-dedicated electrode foil.

2. The positive electrode plate according to claim 1, wherein
the corrosion-resistant layer is in direct contact with the metal aluminum that forms the aluminum electrode foil.

3. The positive electrode plate according to claim 1, wherein
the corrosion-resistant layer is made of a carbide of the at least one substance.

4. The positive electrode plate according to claim 1, wherein
the corrosion-resistant layer is made of a carbide or an oxide of tungsten.

5. The positive electrode plate according to claim 1, wherein
a diamond-like carbon coating of 0.5 nm to 50 nm in thickness is provided on the corrosion-resistant layer.

6. The positive electrode plate according to claim 1, wherein
the positive electrode active material contains a Li compound, and the positive electrode active material layer is formed by applying a water-based active material paste whose solvent is water.

7. A battery comprising:
a power generation element that includes the positive electrode plate according to claim 1.

8. The battery according to claim 7, comprising
an electrolyte solution that contains an Li ion,
wherein the positive electrode active material layer contains the positive electrode active material that includes a Li compound.

9. The battery according to claim 8, wherein
the electrolyte solution contains $LiClO_4$.

10. A vehicle equipped with the battery according to claim 7.

11. A battery-equipped appliance that is equipped with the battery according to claim 7.

12. A manufacture method for a positive electrode plate that includes a battery-dedicated electrode foil, and a positive electrode active material layer that is supported on a main surface of the battery-dedicated electrode foil, and that contains a positive electrode active material, wherein
the battery-dedicated electrode foil comprises
an aluminum electrode foil in which metal aluminum is exposed, or which has on metal aluminum an aluminum oxide layer of 3 nm or less in film thickness; and
a corrosion-resistant layer on a surface of the aluminum electrode foil, and being in direct contact with the metal aluminum of the aluminum electrode foil, or in contact with the aluminum oxide layer, the corrosion-resistant layer being made of a carbide of at least one substance selected from the group consisting of tungsten, tantalum, hafnium, niobium, molybdenum, and vanadium, wherein a thickness of the corrosion-resistant layer is 3 nm to 90 nm, and
the positive electrode active material layer contains the positive electrode active material that includes a Li compound, and
the positive electrode active material that includes the Li compound is contained in the main surface of the battery-dedicated electrode foil,
the manufacture method comprising
a positive electrode active material layer formation step of forming the positive electrode active material layer by applying and drying a water-based active material paste whose solvent is water.

* * * * *